No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 3.
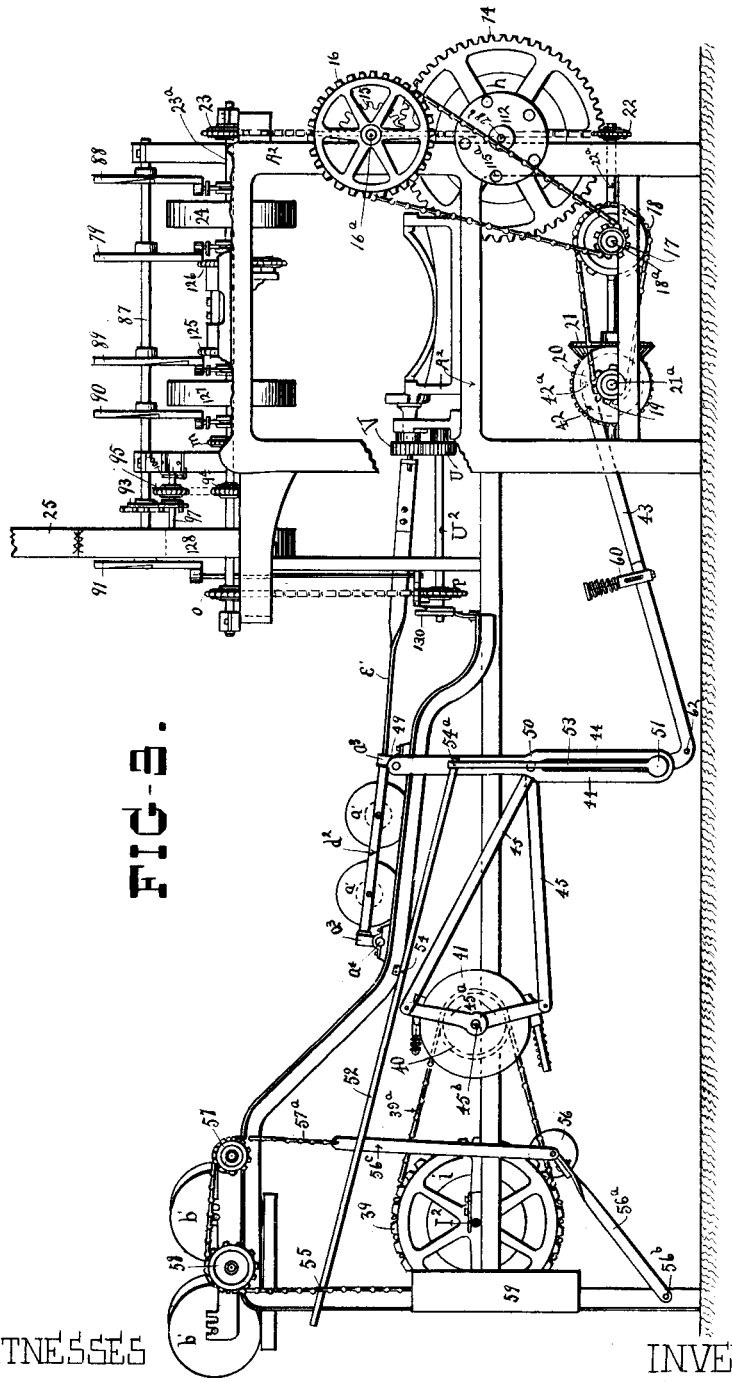
WITNESSES
Will. L. Paul.
Minnie Haley
INVENTORS
PETER SOMMER
JOHN SOMMER
PETER W SOMMER
BY W. V. Tiff ATTY.

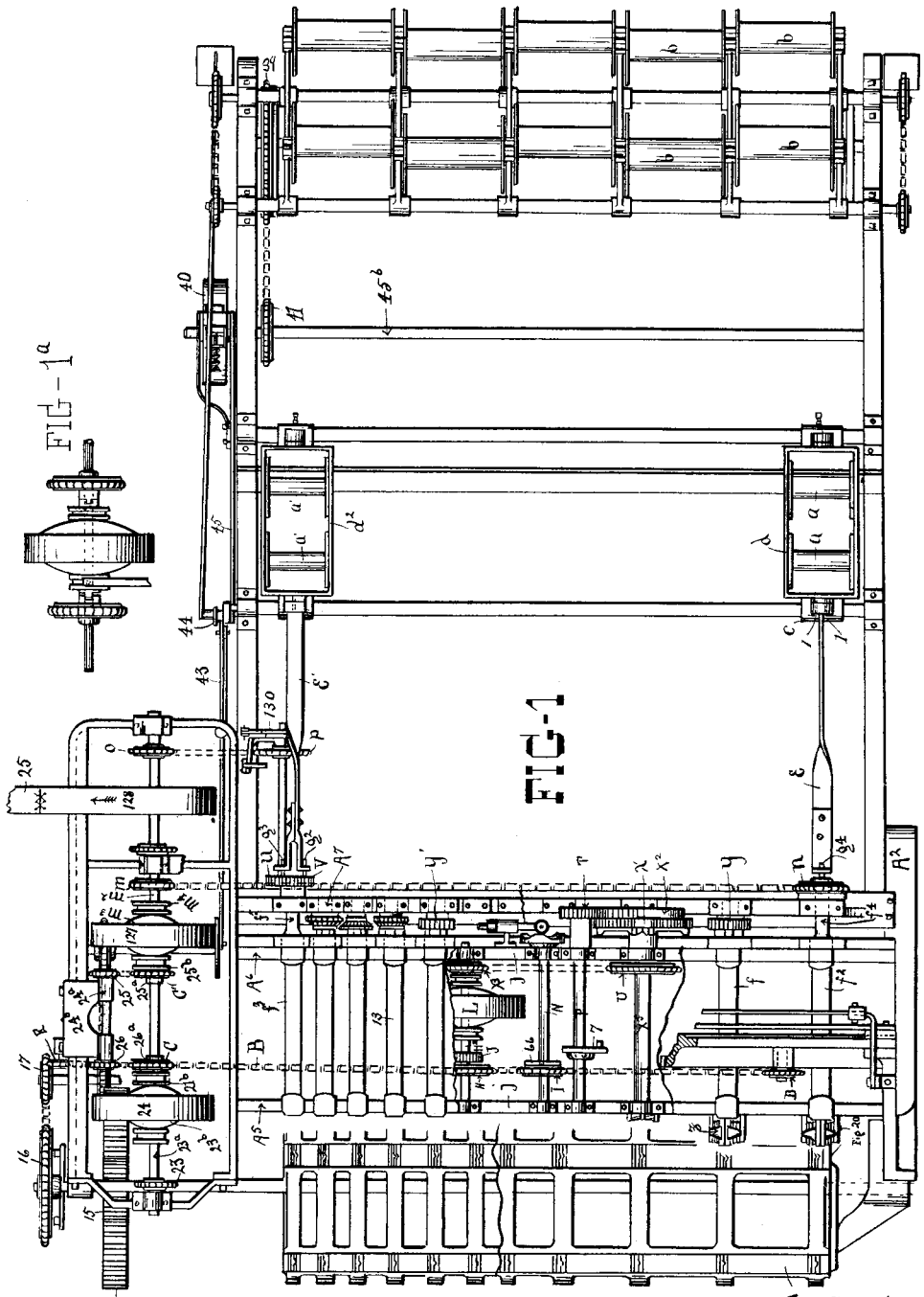

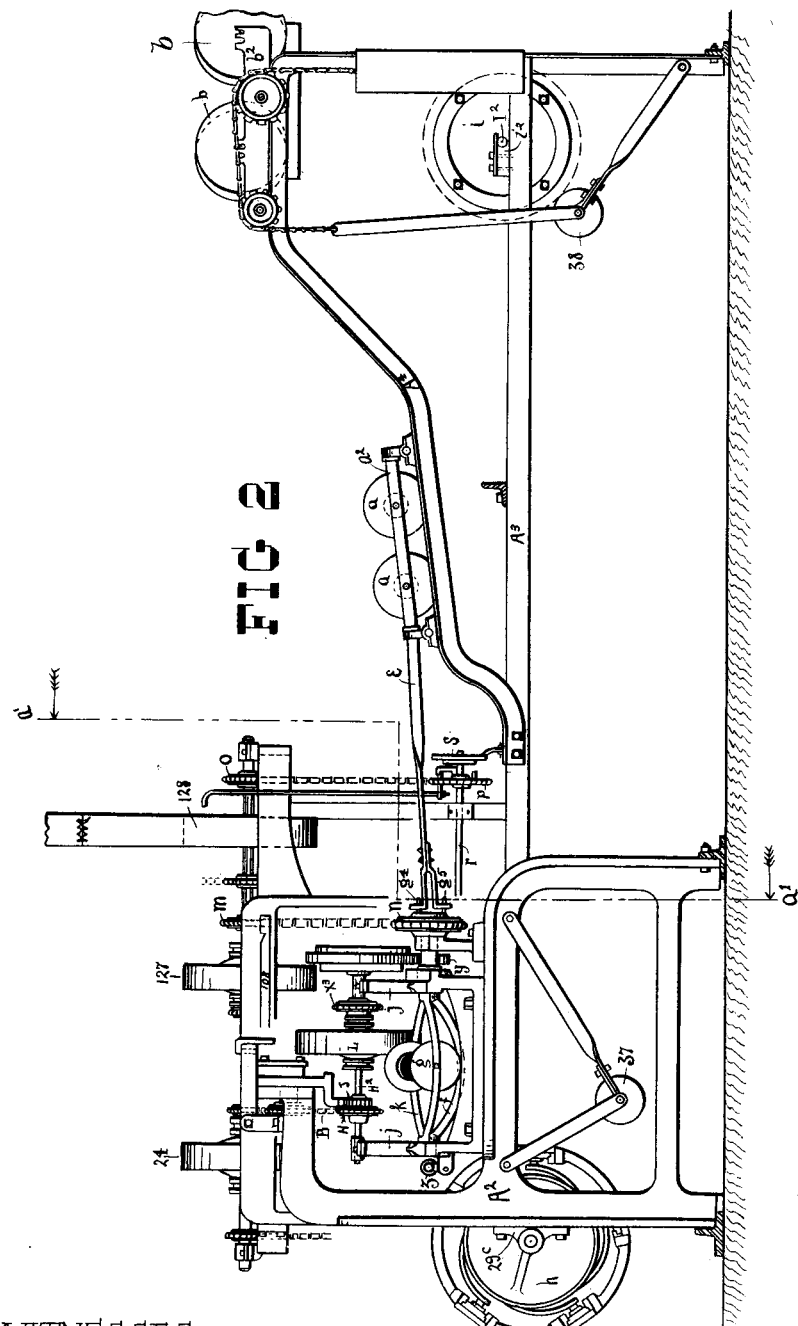

No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 4.
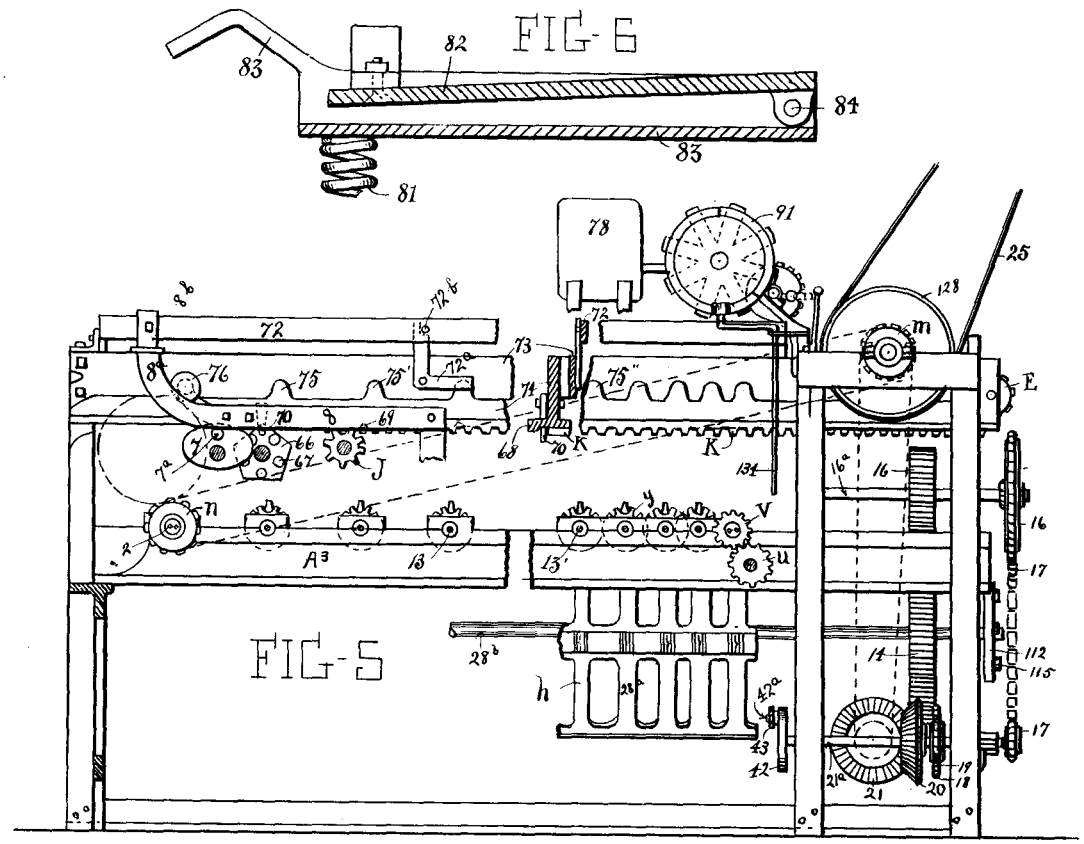
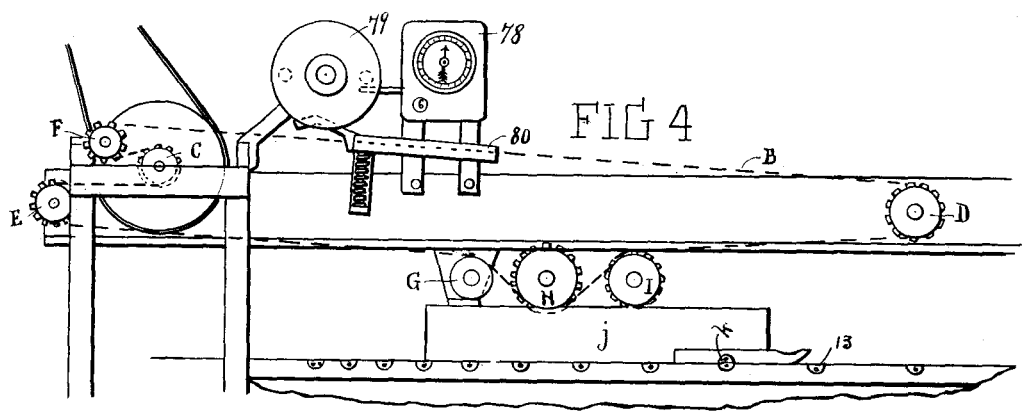
WITNESSES
Will L. Paul
Minnie Haley
INVENTORS
PETER SOMMER
JOHN SOMMER
PETER W SOMMER
BY W. V. Tifft ATTY No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 5.
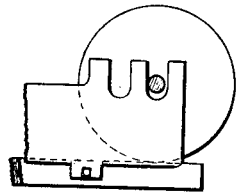
FIG. 7
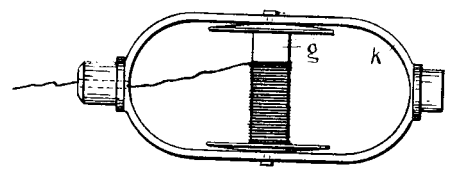
FIG. 8
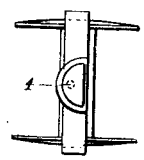
FIG. 8ª
Fig. 8ᶜ
FIG. 10ª
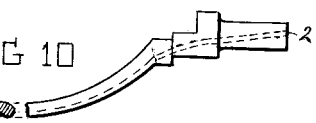
FIG. 10
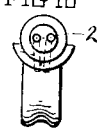
FIG. 10ᵇ
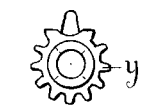
FIG. 11
FIG. 9ª
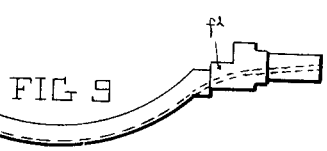
FIG. 9
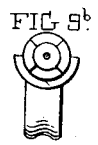
FIG. 9ᵇ
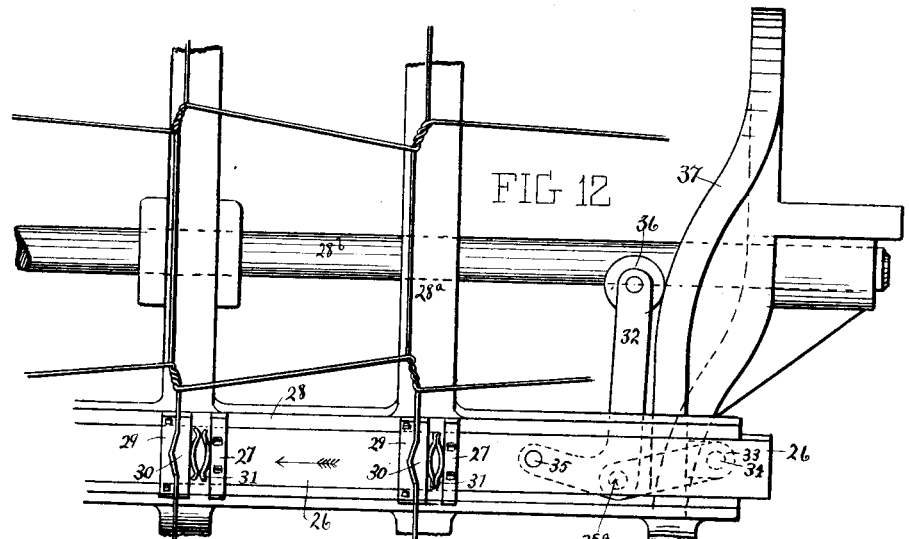
FIG. 12
WITNESSES
Will L. Paul
Minnie Haley
INVENTORS
PETER SOMMER
JOHN SOMMER
PETER W. SOMMER
BY W. V. Tefft ATTY No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 6.
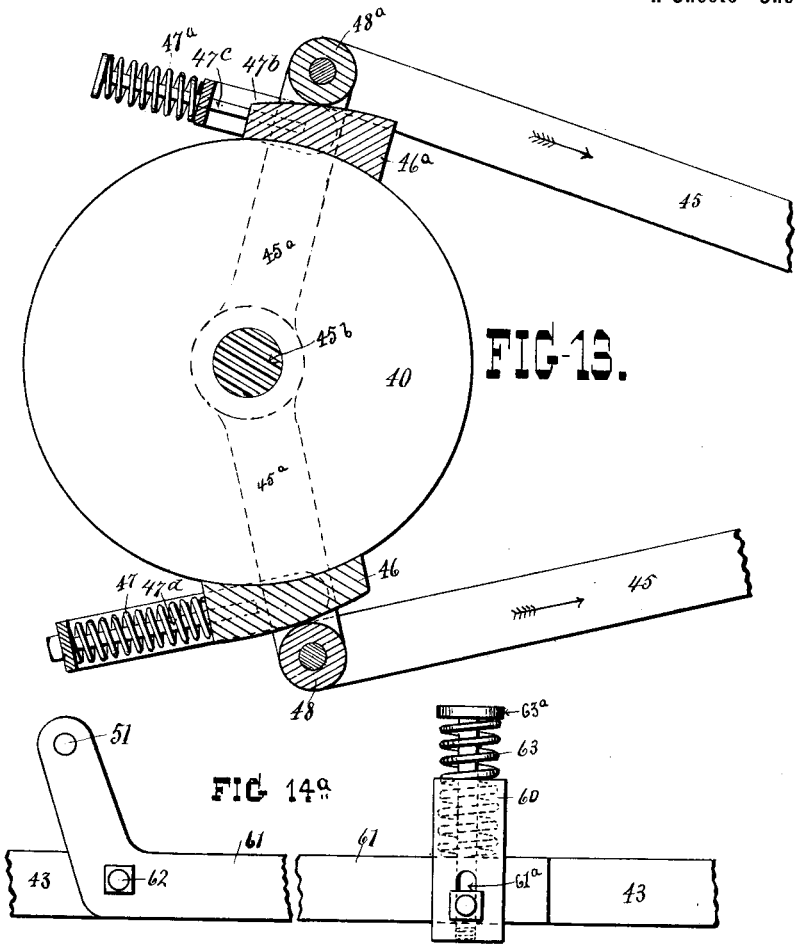
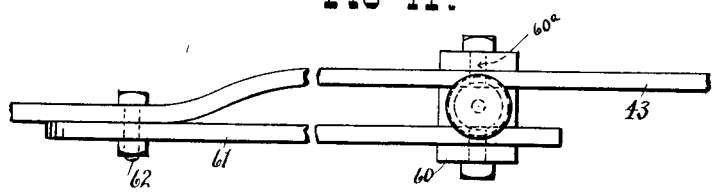
WITNESSES —
Will L. Paul
Minnie Haley
INVENTORS =
PETER SOMMER
JOHN SOMMER
PETER W SOMMER
BY W. V. Tifft ATTY No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 7.
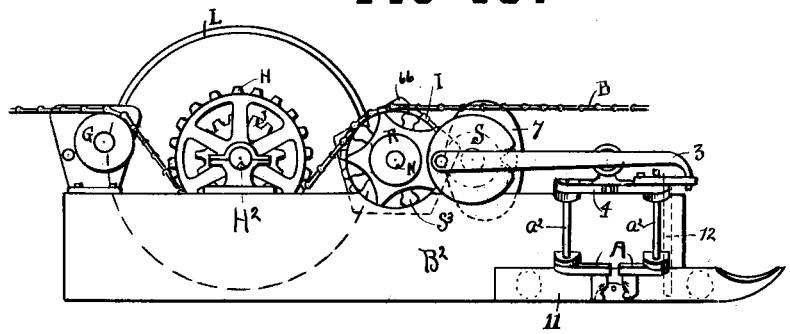
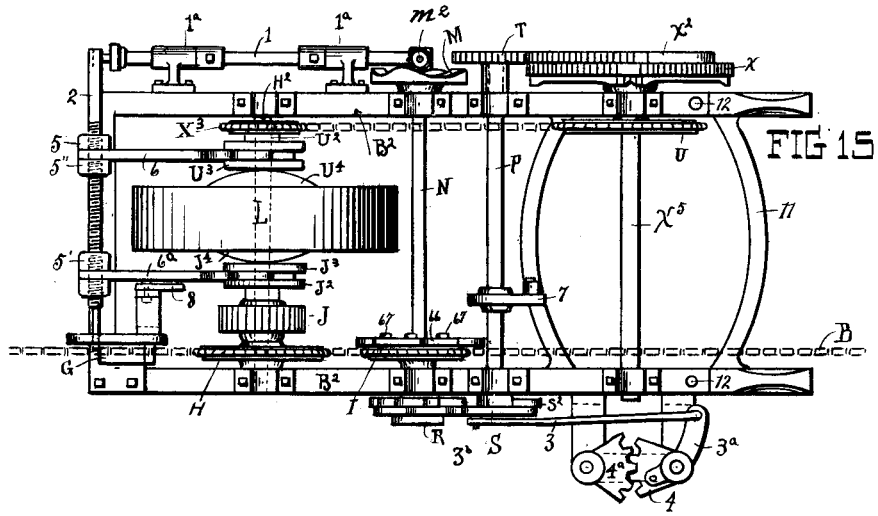
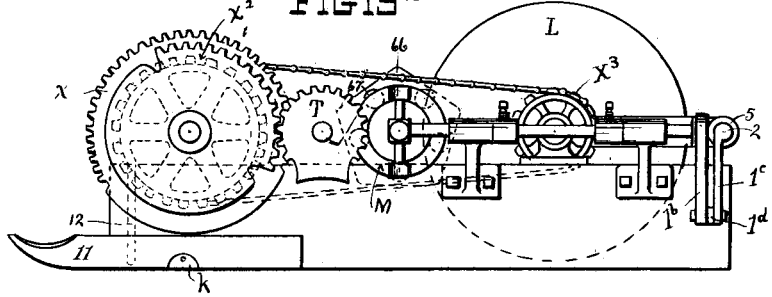

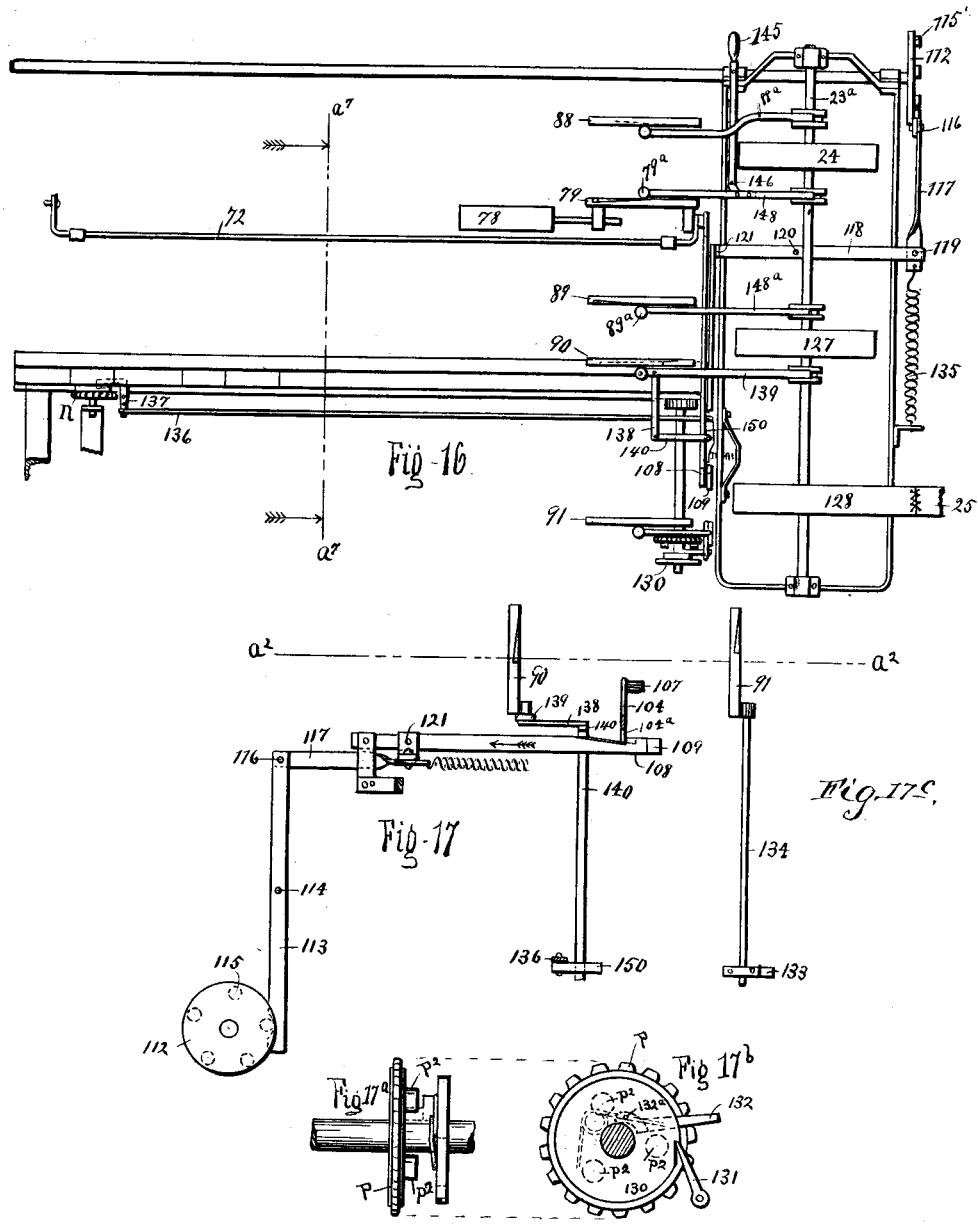

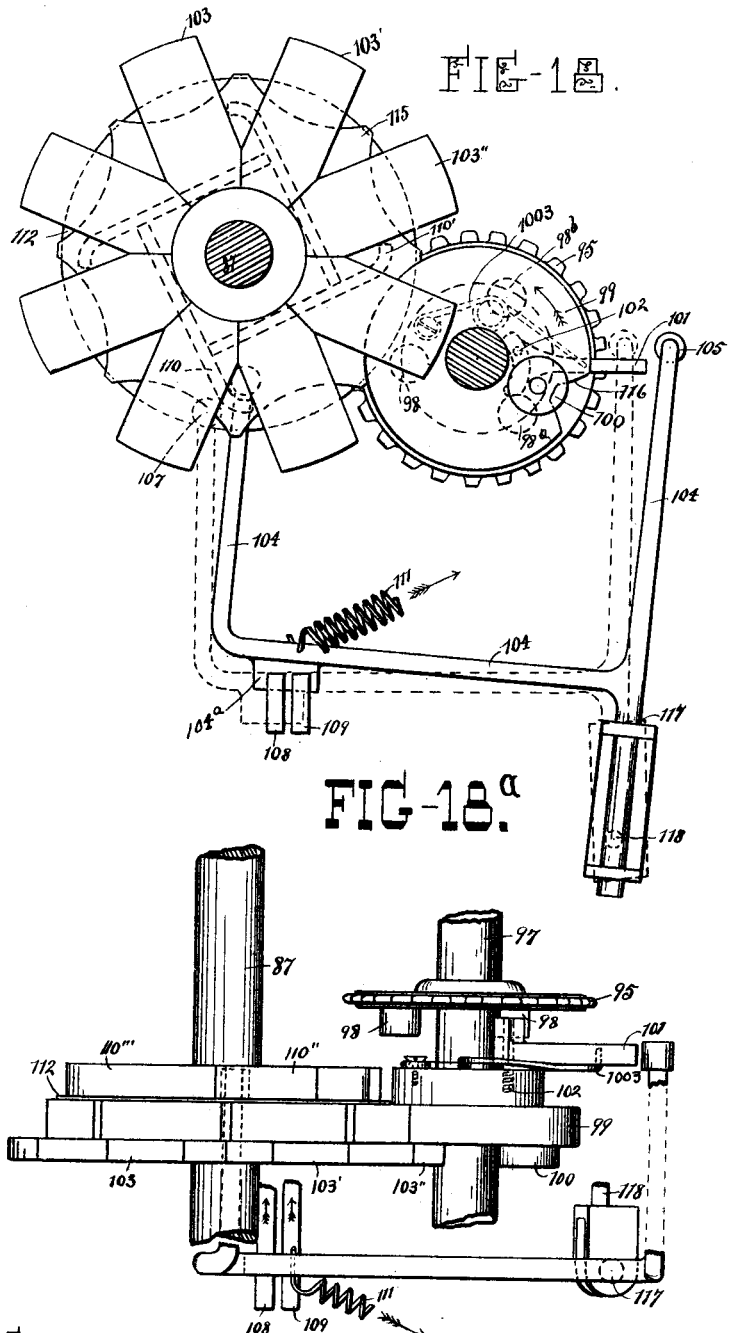

No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 10.
FIG. 19     FIG. 19ª     FIG. 19ᵇ
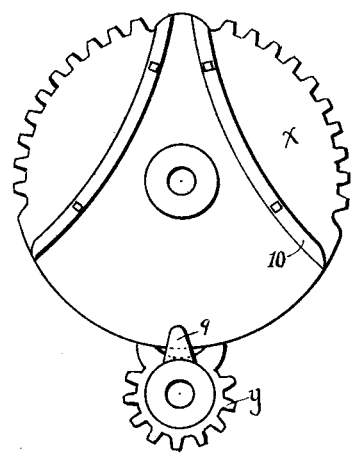 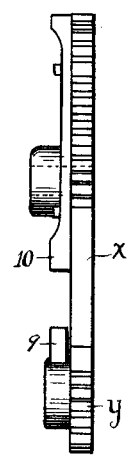 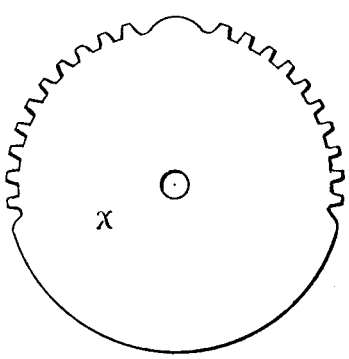
FIG. 20     FIG. 20ª
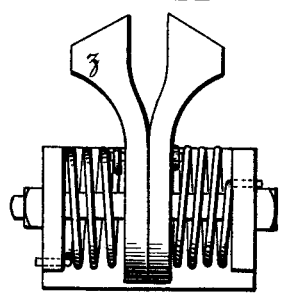 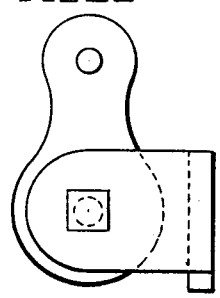
WITNESSES
Will L. Paul
Minnie Haley
INVENTORS
PETER SOMMER
JOHN SOMMER
PETER W. SOMMER
BY W. V. Tifft ATTY No. 635,405. Patented Oct. 24, 1899.
P., J. & P. W. SOMMER.
WIRE FABRIC MACHINE.
(Application filed Feb. 3, 1894.)
(No Model.) 11 Sheets—Sheet 11.
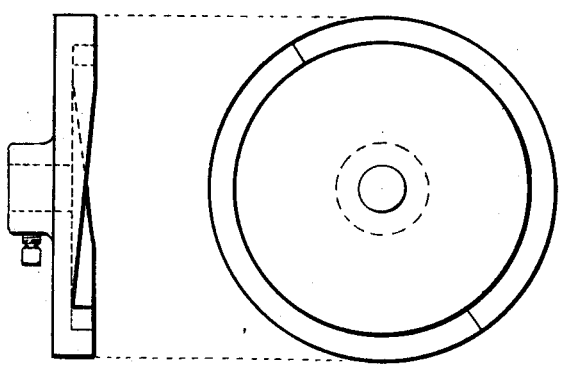
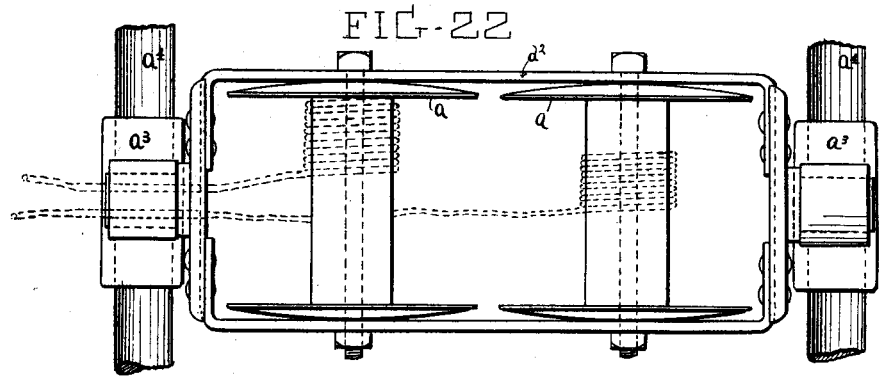
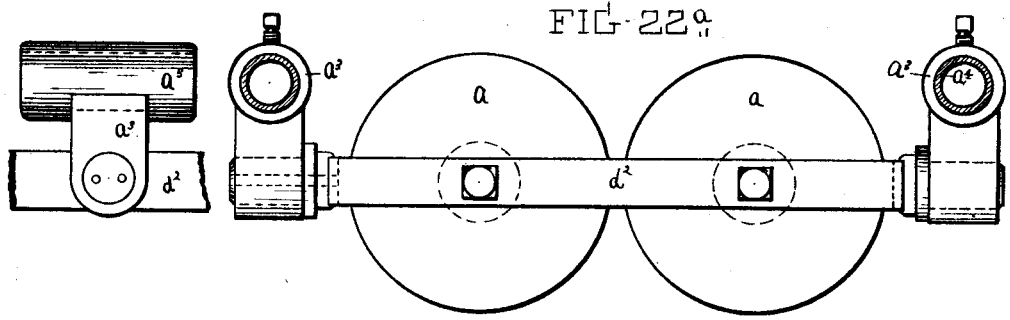
WITNESSES
Will L. Paul
Minnie Haley
INVENTORS
PETER SOMMER
JOHN SOMMER
PETER W SOMMER
BY W. V. Tifft ATTY

UNITED STATES PATENT OFFICE.

PETER SOMMER, JOHN SOMMER, AND PETER W. SOMMER, OF TREMONT, ILLINOIS.

WIRE-FABRIC MACHINE.

SPECIFICATION forming part of Letters Patent No. 635,405, dated October 24, 1899.

Application filed February 3, 1894. Serial No. 499,016. (No model.)

*To all whom it may concern:*

Be it known that we, PETER SOMMER, JOHN SOMMER, and PETER W. SOMMER, citizens of the United States, residing at Tremont, in the county of Tazewell and State of Illinois, have invented certain new and useful Improvements in Wire-Fabric Machines; and we do hereby declare that the following is a full, clear, and exact description of the invention, which will enable others skilled in the art to which it appertains to make and use the same.

Our invention relates to certain new and useful improvements in machines for manufacturing woven-wire fencing, by means of which a machine is provided being complete and efficient in its working for the purpose designed.

More particularly, our invention relates to that class of woven-wire-fencing machines which are purposed to use nothing but wire in the production of the fencing and which product is commonly called "woven-wire" fencing; and the particular woven-wire fencing our machine is designed to produce consists of a series of strand-wires carried at intervals apart, which said intervals may be regulated or graduated, as may be desired, with the strands running parallel with each other and the said several parallel strand-wires connected by a continuous wire carried from side to side, the entire width of the fabric being formed and twisted upon and with the said parallel strand-wires at the intersecting points, the style of interlocking being commonly caused by twisting of the two wires to form short cables at the intersecting points. The particular style of fencing which this machine is designed to construct is illustrated, described, and claimed in Letters Patent issued to ourselves October 29, 1889, and bearing No. 414,125, and the machine which we are illustrating and describing in this application embodies some of the essential features of Letters Patent issued to us, No. 490,775, and bearing date the 31st day of January, 1893.

Our invention consists generally in the construction of the machine embodying a complete system of automatically-operated parts working together to produce an automatic machine—that is, when the wire for producing the fabric has been supplied and the strands thereof properly drawn to connect with the various parts of the machine, and the machine set in operation with the said wire thus supplied and directed will cause the said wires to be woven together to produce the style and kind of fabric above described in a perfect and substantial condition.

Our invention therefore embodies means for holding the wires, which consists of a number of spools properly located upon the framework and from which the wires are drawn, of mechanism for drawing out the line-wires, which in this machine is a rotary clamp which in its operation of drawing out the line-wires draws out the fabric, and is so timed in its operation (the same being intermittent) that it properly spaces the fabric to produce regular and uniform meshes. The particular description and operation of this rotary clamp are contained in an application for patent, Serial No. 494,719, filed December 26, 1893, thereon now pending in the Patent Office, in which application a specific claim is made therefor.

The invention also embodies an automatically-operated reel upon which the woven-wire fencing is rolled into bundles ready for shipment. This said reel is timed to operate simultaneously with the operation of the rotary clamp and is supplied with the necessary supplemental parts to graduate the movement of the said reel to accommodate rolling of the fabric thereon just as fast as it is drawn out by the clamp, so that there will be neither slack nor tension upon the fabric.

The invention further embodies a twisting-spindle formed of two sections relatively in adjustment, upper and lower sections, the lower sections thereof being in series and stationary with relation to the framework, but journaled to revolve in conjunction with the upper section. The upper section of the spindle is shiftable with relation to the lower sections and is carried back and forth over the lower sections for successive matching relation therewith and is suitably journaled in a shiftable carriage and is stationary with reference to the carriage, its movement for such matching relation with the lower sections depending upon the movements of the said carriage. The detailed and particular description of this spindle is set forth in our patent numbered 490,775, bearing date January 31, 1893, so far as its general construction is concerned; but certain details of formation, which added to the respective parts of the spindle herein employed, constitute material and valuable improvements over the sections described and claimed in said former patent to us.

Our invention further embodies an automatic center, which unites at a given point the motor functions of the machine and properly directs, times, graduates, and terminates all movements of the various automatic parts when the machine is in operation, the particular and detailed construction of which will be hereinafter pointed out in the drawings and fully described in the specification; and finally our invention embodies many other details of construction, which are added as supplemental parts materially essential in perfecting the economical operation of the device and secondary only in the sense that they contribute to the more effective working of the central features of the machine.

That our invention may be more fully understood, reference is had to the accompanying drawings, in which—

Figure 1 is a plan view of the machine with some parts omitted that would obstruct a view of the main body or framework thereof, the said parts omitted being particularly shown in other figures. Fig. 1$^a$ is a detailed view of a clutch mechanism, the kind used in the several parts of the machine where clutch mechanisms are required. Fig. 2 is a side elevation of a machine on the right side thereof. Fig. 3 is a side elevation of the machine, showing the left side thereof. Fig. 4 is a detailed view of a portion of the forward part of the machine. Fig. 5 shows an elevation of the machine through the line $a'$ $a'$ of Fig. 2, which line cuts off the rear part of the machine and shows the rear portion of the front part only. Fig. 6 is a detailed view of a brake or chain retarder. Fig. 7 is a detailed view showing the manner of mounting the spools for carrying the line-wires. Fig. 8 is a plan view in detail of the upper section of the spindle, showing the spool mounted therein for carrying the continuous wire. Fig. 8$^a$ covers end views in detail of the same as Fig. 8. Fig. 9 is a side view in detail of one of the lower intermediate sections of the series. Fig. 9$^a$ is a detailed view showing the front end of the said section. Fig. 9$^b$ is a detailed view showing the rear end of the same section. Fig. 10 is a detailed view showing the particular construction and form of the respective lower sections at the extreme right and left sides of the machine or the outside sections of the series with the middle portion thereof broken out and turned in the transverse position. Fig. 10$^a$ shows the front end of the said section. Fig. 10$^b$ shows the rear end of the said section. Fig. 11 is a detailed view of a cog-wheel designed to be carried upon the rear end of each of the intermediate sections $f$. Fig. 12 is a detailed view showing the structure of a revolving clamp carried upon the framework and in the forward end of the machine and also the manner of its engagement with the strand-wires. Fig. 13 is a detailed view of a friction-clutch used in connection with the operation of the reel for rolling the wire-fence fabric into bundles. Fig. 14 is a detailed view of the same viewed from the top. Fig. 14$^a$ is a detailed view showing from one side a connecting-reach used between an eccentrically-disposed pin on a face-plate, from which the said reach derives a forward-and-backward movement, and the mechanical parts designed to operate the reel. Figs. 15, 15$^a$, and 15$^b$ illustrate the detailed structure of a carriage designed for shifting relation upon the framework of the machine, Fig. 15 showing a front view thereof; Fig. 15$^a$ a plan view, and Fig. 15$^b$ a side view, of the same carriage, it being shown in its operative connection with the machine in Fig. 2. Fig. 16 is a detailed view showing an automatic center and the various mechanical parts that connect with the different working parts of the machine or so much thereof as may be shown in this figure. Fig. 17 is a detailed view through the line $a^7$ $a^7$ of Fig. 16, which shows further in detail the parts of the automatic arrangement. Figs. 17$^a$ and 17$^b$ are also detailed views of the same part and in side and front elevations and are elements in the automatic center and are contained in Figs. 16 and 17. Fig. 17$^c$ is a detailed view showing the relation between a disk and a reach. Figs. 18 and 18$^a$ are detailed views of a part of the automatic center, shown in elevation and from the top, respectively. Figs. 19, 19$^a$, and 19$^b$ show particularly the detailed structure of a wheel circumferentially partially cogged with a lobed intervening part and having a portion of its circumference smooth, and further shows its connection with a cogged wheel of a peculiar shape adapted to operate in connection therewith, Fig. 19 being a face view, Fig. 19$^a$ a side elevation, and Fig. 19$^b$ the opposite face view from that shown in Fig. 19. Figs. 20 and 20$^a$ are detailed views of fingers designed to be carried upon the framework of the machine and the forward part thereof in such adjustment as to accommodate the bearing of the line-wires through the opening between the respective fingers, as shown in Fig. 1, Fig. 20 showing a front elevation of the said fingers, and Fig. 20$^a$ a side elevation of the same, excepting that in Fig. 20$^a$ only one finger can be seen, while in Fig. 20 the two fingers are shown. Fig. 21 is a detailed view showing the particular formation of disk wheels used in connection with the automatic part or directing center of the machine shown in Fig. 16. Figs. 22 and 22$^a$ are detailed views of spool-carrying frames designed for the winding thereon of wires used to form cables, which constitute the outside strands of the fabric and of their adjustment upon the framework of the machine, which shows them journaled for rotation, Fig. 22 showing the plan view of the spool-carrying frame, and Fig. 22ª a side view of the same.

In the figures, $A^2$, $A^3$, and $A^4$ refer to the main or supporting framework, which are the side pieces thereof and are connected by suitable cross-pieces especially provided for strengthening the framework, this framework and connecting cross-pieces providing supports for the various operative parts of the machine.

In referring to the different parts of the machine for the purpose of convenience we will take up separately the main points or operative parts and describe them fully, and will then show their connection the one with the other to perform their several independent and united functions, and finally connect them with the power or source of movement, and then describe in detail the operation of the complete device.

$b$ $b$, &c., are spools consisting of two disks of uniform size and provided with smooth-surfaced peripheries and connected at their centers and provided with suitable pin projections from the sides thereof designed to be carried in notches in the frame parts $b^2$, with the rims thereof bearing upon suitable surfaces, which surfaces constitute the supports for the said spools, instead of the pins within the notches, such bearing of the rims of the spools upon the surfaces providing a suitable tension for the wires. These spools, which may be of any number, are arranged in any suitable manner to suit their application and to accommodate the provision of as many strands of wire as may be desired. $a'$ $a'$ are spools carried in the framework $d^2$, as shown in Figs. 1 and 2 and more particularly shown in detail in Figs. 22 and 22ª, in which said figures the said framework is shown journaled in boxes $a^3$ $a^3$, supported upon cross rods or tubes $a^4$ $a^4$, and are adapted to have wires wound thereon and to be turned with the framework $d^2$ in the operation of the machine, there being provided on the opposite side of the machine another such framework and pair of spools, the same being referred to in the drawings, the spool-carrying frame being indicated by $d$ and the spools by $a$ $a$, the purpose of the double spools in the spool-carrying frames being to supply two strands of wire, which pass through perforations in the forward journals of the said spool-carrying frames for the cables, which constitute the outside strands of the fabric, the spools $b$, as previously explained, supplying the intermediate or single strands. $g$ is a spool carried in the divided portion of section $k$ and is designed to supply the continuous wire, which is purposed to be carried back and forth across the plane of the strand-wires and to be twisted therewith at the crossing or intersecting points to form short cables. Through and by means of these spools $b$ $b$, $a$ $a$, and $d'$ $d'$ and $g$ all the wires are supplied that are necessary in the formation of the woven-wire fencing.

The twisting mechanism or spindle consists of the upper section $k$, which has been denominated and will hereinafter be referred to as the "shifting" section, and the lower sections $f$, $f^2$, and $f^3$, there being provided but one shifting section, while there are employed a series of lower stationary sections—that is, stationary with reference to the framework, but revoluble with the shiftable section $k$. The particular formation of the respective parts of the spindle thus formed, as shown in Fig. 2, may be seen by reference to Figs. 8, 8ª, 9, 9ª, 10, 10ª, and 10ᵇ. In Fig. 8 the particular manner of carrying the spools $g$ in the framework $k$ of the shiftable section is shown, and in Fig. 8ª the particular shape of the forward journal is shown, it being semicircular and with a perfectly flat side, it making one-half of a complete journal, and is provided with a perforation, as at 4, for passage through of the wire from the spool $g$, the journal at the rear end having the same form as the forward journal, but not provided with a perforation. In Fig. 9 the particular form of the respective intermediate lower sections—that is, the sections between the two outside ones—will be seen, showing the same bowed at their central portions and provided at their forward ends each with a half-journal the same as the forward end of the shiftable section, and the rear portion adjacent to the bowed part of the said section is also formed with a half-journal, the upper portion of the complete journal being cut away, while the extreme rear end of the said section is round and provides a bearing for a cog-wheel, there being one provided upon the rear extremity of each of the respective intermediate sections, the particular formation of which and its relation with other operative parts of the device will hereinafter be more particularly explained. The respective intermediate sections are also provided, as shown, with perforations, one in the rear end of the section and one in the forward half-journal thereof, the wire carried in the said section passing first through the perforation in the rear end of the section, then underneath in a suitable groove in the bowed part of the section, and finally out through the perforation in the forward end or half-journal thereof. The formation of the outside sections is only different in that there are two perforations in the respective ends of the sections instead of one, as illustrated in Figs. 10ª and 10ᵇ, these being the sections through which the double strands are carried, which are twisted together to form the cables or outside strands of the fabric. The delivery ends of the passages or perforations in these sections are recessed or depressed in order to facilitate the twisting of the wires. As previously explained in this specification, the sections $f$, $f^2$, and $f^3$ are arranged in series in a bed-frame and are adjusted at intervals either regular or graduated, according to the width of mesh desired, in making the different styles of wire-fence fabric, and the shiftable section is journaled within a shifting carriage and is carried therewith, there being but one such shiftable section, which is designed to be moved back and forth across the plane of the strand-wires and upon the bed-frame, which supports and within which are journaled the stationary sections $f$, $f^2$, and $f^3$ for matching relation successively with the respective lower sections or the half-journals thereof and to be rotated with the respective sections successively as the half-journals of each are in coincident relation for the purpose of twisting the continuous wires with the line-wires at the intersecting points.

The revolving clamp is adjusted at the extreme forward end of the machine and in front of the twister-sections and secured to the framework in the journal-boxes $29^c$, bolted thereon, and within which said boxes the shaft supporting the clamp is designed to be turned, the adjustment of the clamp being such that the upper edge thereof is on a line with the perforations in the sections $f$, $f^2$, and $f^3$, which adjustment of the clamp may be seen by reference to Fig. 2. The detailed construction of the said clamp may be seen by reference to Fig. 12, in which said figure, $28^b$ is the supporting-shaft, which passes through the center of the clamp and is journaled in boxes $29^c$.

$28^a$ are circular frame parts connecting the transverse body-pieces 28, which said transverse body-pieces are adjusted at intervals around the circumference of the circular connecting frame-pieces $28^a$, and each of the said body-pieces is suitably grooved or recessed for the reception of the plate or bar 26, which is designed to fit perfectly within said recess and to slide back and forth therein, with the upper face thereof alining with the upper face of the transverse body-pieces 28.

29 29' are strips of metal of suitable thickness bolted upon the upper face of the respective transverse body-pieces 28, the said strips spanning the recess therein, with the bar 26 designed to slide underneath. The said strips 29 29' may be serrated or formed irregularly upon one side, substantially as shown, they being designed to form the stationary part of a series of jaws, the other part of the said jaw being adjusted upon and secured to the sliding bar 26, this part of the jaw being divided into parts 27 27', which are securely bolted or fastened to the sliding bar 26, the part of the jaws 30 30' being connected with the parts 27 27' by means of pins projecting from the parts 27 27' and being carried through perforations in the said parts 30 30', said parts 30 30' being designed to move back and forth upon the said pins, there being provided a suitable spring between parts 27 27' and 30 30', thus providing through the union of the parts 27 27' and 30 30' to form the adjustable parts of the jaws, the forward faces of the parts 30 30' being cut to conform with the irregular face of the strips 29 29'. The bars which operate to move the adjustable sections of the jaws carried thereon to alternately open and close the complete jaws are actuated by means of the angle-bar 32, being pivotally secured to the bar 26, as at 35, and also pivotally secured to the short bar 33, as at $35^a$, which said short bar 33 is pivotally secured to the body-pieces 28, as at 34, and the free end of the said angle-bar 32 is provided with the antifriction-roller 36, which is designed to contact with the irregular disk or cam 37, which is stationary in its adjustment, it being suitably fixed, as shown in the drawings, to one of the journal-boxes $29^c$ and may be an integral part thereof, the said jaws being designed to alternately open and close to alternately engage and release the line-wires of the fence fabric as the clamp is turned for the purpose of drawing the line-wires out as the fabric is woven by the machine, and the operation of the said jaws in opening and closing is so timed as to engage and release the strand-wires at exactly the proper time to best facilitate in performing the drawing-out function of the machine. The detailed operation of the said clamp in connection with the operation of the complete device will be hereinafter more fully described.

The wire fabric formed by the line-wires being connected by the twisting of the continuous wire therewith at the intersecting points as the continuous wire is carried over the plane of the line-wires, thus forming the meshes, is engaged by the revolving clamp just above described, and is carried around with the movement of the clamp underneath the same and passes rearwardly over guide-roller 37, and is wound or rolled upon the reel I, the reel proper consisting merely of the center shaft $I^2$, journaled upon the framework, as at $i^2$, the side pieces of the reel being connected by suitable cross-pieces—as, for instance, tubes—properly secured to said side pieces to provide a winding-surface for the fabric. As the particular mechanism used in connection with the operation of the said reel is so closely related and particularly essential to its operation and as the said parts have no function to perform in connection with any other part of the device, we will refer to and describe these parts in this connection.

Indirectly the reel proper derives its movement from the face-plate 42, having the eccentrically-disposed pin $42^a$, with which reach 43 is connected; but its continuous movement is regulated by intermediate parts. As previously mentioned, 43 is a reach connected eccentrically with pin $42^a$ on face-plate 42 at its forward extremity, and at its rearward extremity it is connected with the supplemental reach 61, near the rear end of the said supplemental reach, by means of bolt 62, as shown in Figs. 14 and 14ª, the connection being pivotal and not rigid, and the forward part of the supplemental reach is connected with said reach 43 by means of bolt 60ª, carried through a slot 61ª in the said supplemental reach and through a perforation in reach 43 and also through the sides of the frame part 60, into the bottom part of which is screwed the bolt 63ª, with the spring 63 bearing between the expanded head of the said bolt 63ª and the top edges of the respective reaches 43 and 61 in a somewhat-compressed condition, which spring device is provided to relieve the jar attendant upon the backward-and-forward movement of the said original and supplemental reach occasioned by the resistance of the elements of the machine being operated. The said supplemental reach 61 at its rear end and at the upper extremity of the angle part thereof is provided with the pin projection 51, having an expanded head, which said pin projection 51 is carried in the slot in depending bar 44, which said bar is pivoted upon the framework of the machine, as at 49, and is purposed to swing back and forth from said pivotal point, such backward-and-forward movement being imparted thereto by the supplemental reach 61 and the reach 43, connected with face-plate 42, when the said plate is turned. Pivotally connected with the depending bar 44 are the arms 45, which diverge as they extend rearwardly and connect pivotally at their rear extremities with the short arms 45ª, which said short arms are pivoted loosely upon axle 45ᵇ, and upon this axle 45ᵇ is rigidly secured the wheel 40, which has somewhat of an expanded face, and intervening between the circumference of the wheel and the extremities of the arms 45 45ª are the wedges 46 46ª, which, acting in connection with the wheel and the arms referred to, form a friction-clutch, the detailed construction of which is illustrated in Fig. 13, in which the wedges are shown bearing between the circumference of the wheel 40 and antifriction-rollers 48 48ª, journaled upon pins at the extremities of the respective arms 45 and 45ª, the said wedges being held in such position by means of the straps 47ᵇ 47ᶜ, connected with short arms 45ª, which support pins 47ᶜ and 47ᵈ, passing through a perforation in the transverse part of said straps, which said pins are embedded in and secured to the said wedges in the manner shown in the drawings and extend somewhat beyond the transverse part of the strap 47ᵇ, there being provided the spring 47ª, surrounding the said pin and bearing between the head thereof and the transverse portion of strap 47ᵇ in a somewhat-compressed condition, the pin 47ᵈ having the head thereof bearing upon the upper surface of the transverse part of strap 47ᶜ and provided with a spring 47, surrounding the said pin and bearing between the end of the wedge 46 and the transverse portion of the strap 47ᶜ, it being designed by this construction that in the operation of the clutch the wedge 46ª shall be drawn toward the spring 47ª, while the wedge 46 is pushed from the spring 47, so that, in the operation of the device, by drawing the said arms 45 45ª in the direction of the arrows the wedge 46ª will be caused to be impinged between the antifriction-roller 48ª and the circumference of wheel 40, which will cause the said wheel to be turned because of such impingement, and the same movement will tend to free the wedge 46 from binding contact with the said wheel 40. The opposite motion of the said arms 45 45ª will cause the wedge 46 to be impinged between antifriction-roller 48 and the circumference of the wheel 40, thus causing the said wheel to be turned and in the same direction as in the forward movement of the said arms, but the said wheel 40 being actuated continuously in one direction alternately first by one wedge and then the other. The shaft upon which the wheel 40 is rigidly secured extends entirely across the machine and is journaled in the framework thereof. 41 is a sprocket-wheel upon the shaft 45ᵇ, and 39 is a sprocket-wheel upon the shaft I³, which supports the framework of the reel which is rigidly secured thereto, the said sprocket-wheels 41 and 39 being connected by means of the sprocket-chain 39ª, so that as the shaft 45ᵇ is turned with the friction clutch-wheel 40 the reel is turned through its sprocket-wheel and sprocket-chain connection therewith.

In rolling up the wire upon the reel its varying diameter would tend to roll up the fabric either too fast or too slow if the movement of the reel were such as to perform the same number of revolutions in a given time. To regulate the turning of the reel in use that it may be so timed that it will roll up the fabric just as fast as it is drawn out by the revolving clamp, the roller 56 is provided and designed to bear at all times against the surface of the wire being rolled upon the reel and is mounted in such position by being pivotally swung upon bar 56ª, pivoted to the framework, as at 56ᵇ, and supported from above by a pivotal connection with bar 56ᶜ, which said bar is connected with sprocket-chain 57ª, carried over sprocket-wheels 57 and 58, suitably journaled upon projections from the main framework and said sprocket-chain 57ª supporting the weight 59, which forces the roller 56 continually in contact with the surface of the wire rolled upon the reel, and connected with the sprocket-chain 57ª, as at 55, there is provided the long lever 52, fulcrumed at 54 and pivotally connected, as at 54ª, with the perpendicular reach 53, connected with the head of the pin 51 upon the end of the supplemental reach 61, by which said connection of the roller 56 with the pin 51 through and by means of the various specified elements the oscillation of the depending slotted bar 44 will be effected and regulated, which said regulation of the oscillation of the said bar 44 will likewise effect the movement of the said arms 45 45ª, also the clutch-wheel 40, and finally the reel itself.

For instance, when the pin 51 is carried in the extreme upper part of the slot in the oscillating bar 44, which would bring the pin close to the pivotal point 50 of bars 45 45, then the movement of the said arms 45 45 would be long, as they are actuated by the oscillation of bar 44 through the reach 43 when the face-plate 20 is turned, and the said pin 51 would occupy such elevated position within the slot when the reel was empty or practically so, and the roller 56, bearing against the surface thereof, would cause the weight 59 to be in a somewhat depressed position, which would of course, through the movement of the sprocket-chain 57$^a$, depress the lever 52 and raise the pin 51 through the connection 53; but as the roll increases in size upon the reel roller 56 would be forced down gradually, thus raising the weight 59, which would cause the rear end of the lever 52 also to be raised, which will cause the pin 51 upon the supplemental reach 61 to be depressed, which would result in a gradual decrease in the oscillation of slotted bar 44 and a corresponding decrease in the extent of the forward and backward movement of the arms 45 45, which would result in the gradual decrease of the movement of the friction-clutch wheel 40, from which the reel receives its motion through and by means of the sprocket-wheel and sprocket-chain connection. The elements herein shown, arranged in the proper manner and mechanically constructed and operated, will provide a reel that will automatically be timed to roll up the fabric just as fast as it is drawn from the machine without regard to the increase in the size of the roll being wound upon the reel.

As previously explained, the wire-twisting function of the machine is performed by the spindle formed by the matching of a shiftable section carried in a shifting carriage matching successively with the different lower sections. These lower sections $f$, $f^2$, and $f^3$ are carried in the bed-frame A$^3$, having the side pieces A$^5$ A$^6$, provided with recessed upper edges, as shown in Figs. 1, 2, 3, and 5, which said bed-frame occupies a transverse position upon the framework of the machine and is recessed in the upper edges of the side pieces thereof, as previously described, at intervals to form half-journal bearings for the half-journals of the sections $f$, $f^2$, and $f^3$, and the said sections $f$, $f^2$, and $f^3$, when adjusted within the recesses of the bed-frame or upper edges of the side pieces thereof, are on a line with the upper edges of the said side pieces of the bed-frame, thus presenting a smooth and continuous surface upon the edge thereof. Upon this bed-frame and upon the smooth surface of the upper edge thereof there is designed to bear and travel a carriage, the frame parts of which are indicated by B$^2$, which said frame parts are suitably connected by cross-pieces to render the carriage substantial, and within the lower edges of these frame-pieces B$^2$ B$^2$ are cut, one in each, a semicircular depression, or within detachable parts therefrom within which the respective half-journals of the shiftable section $k$ are carried, the said detachable parts being in the form of shoes, (indicated by 11 in Fig. 15$^b$,) these shoes being connected with the frame parts by means of pins, as 12, and being provided to facilitate the removal of the said shiftable section for the supply of new spools of wire designed to be carried therein, and the said shoes having the further function of traveling in advance of the carriage to insure the proper adjustment of the lower sections $f$, $f^2$, and $f^3$, that may happen to be turned out of position, so that they will not interfere with the movement of the carriage. Upon this framework B$^2$ B$^2$ are mounted various elemental parts necessary in the complete operation of the carriage to perform its several functions, it being necessary, of course, that the said carriage shall be moved and that such movement shall be intermittent and that when the carriage is stopped it shall always be in such position that the shiftable section of the spindle, which it carries, shall be in coincidence or matched relation with one of the lower sections $f$, $f^2$, and $f^3$ while a twist is being made of the continuous wire with one of the line wires or cables and that it may be so moved and stopped that the said shiftable section, which it carries, shall be successively matched and rotated with each and every lower section of the series, that the continuous wire may be twisted with the line-wires carried through the several lower sections as the said carriage moves back and forth across the machine or the bed-frame thereof, which supports the said lower sections.

The bed-frame, previously referred to and indicated in the drawings by A$^3$, A$^5$, and A$^6$, supports the main portion of the lower sections $f$, $f^2$, and $f^3$; but the rear extensions of the respective lower sections which carry the cog-wheels $y$ are supported in suitable boxes upon a supplemental portion of the bed-frame, (indicated by A$^7$,) as shown in Figs. 1 and 5, the detailed construction of the said lower sections being shown in Figs. 9, 9$^a$, 9$^b$, 10, 10$^a$, and 10$^b$, and the particular construction of the cog-wheel $y$ is shown in detail in Fig. 11.

The detailed construction of the carriage may be seen by reference to Figs. 15, 15$^a$, and 15$^b$, in which said figures the parts shown are useful particularly to facilitate in the moving of the carriage and in the twisting of the spindle. The movement of the carriage is derived indirectly from sprocket-chain B, which is carried over idle roller G, underneath sprocket-wheel H, and over sprocket-idler I. The sprocket-wheel H is keyed upon the line-shaft H$^2$, which is suitably journaled at its extremities upon the frame-pieces B$^2$ B$^2$. J is a cog-wheel secured upon hollow shaft J$^2$, which said hollow shaft is loose upon the line-shaft and is provided with collars J$^3$, and is connected with friction-clutch J$^4$, which works in connection with clutch-wheel L, it being purposed that the cog-wheel J shall mesh with a cog run or plate of cogs carried immediately above upon a frame part of the machine and in mesh therewith and that the friction-clutch J⁴ shall at the proper time impinge the flange of wheel L to cause the hollow shaft on which cog-wheel J is carried to be turned with the line-shaft H², so that the line-shaft to which sprocket-wheel H is secured being turned continuously by the passage thereunder of the sprocket-chain B will cause the said cog-wheel J to be turned, and as it meshes with the run or plate of cogs the carriage will be caused to be moved according to the direction of movement of the said cog-wheel, and as the sprocket-chain B runs alternately in opposite directions the carriage will therefore be caused to be moved in one direction as long as the sprocket-chain so runs, and with the reverse running of the sprocket-chain the carriage will be caused to be moved in the opposite direction, the said movement in either direction being interrupted at intervals, as will hereinafter be explained.

As previously noted in the operation of the carriage, the hollow shaft J², upon which is fixed the cog-wheel J, in mesh with the run of cogs on the framework, is alternately fixed and loose upon the line-shaft H² through the action of friction-clutch J⁴, connected therewith, upon clutch-wheel L, which said clutch J⁴ is operated indirectly from cam M, fixed on shaft N, to alternately release and impinge the flange of clutch-wheel L, which said shaft N derives its movement indirectly from the partially-cogged wheel X², meshing with partially-cogged wheel T upon shaft P, the turning of which said shaft P causing contact relation between parts S, S², and S³ and R, fixed upon shafts P and N, respectively, the operation of which to so turn cam M will hereinafter be more fully described, and in the movement of the cam M the shift-rod carried in boxes 1ᵃ is caused to be slightly turned by the antifriction-roller $m^2$, adjusted upon the said shift-rod at one extremity at right angles with its length and extending slightly up thereover, forming a short arm, and from the form of the cam M it will be seen that the roller $m^2$ will alternately traverse the depressed and raised portions of the said cam, which will give an alternate opposite direction of movement to the said shift-rod 1, and as the shift-rod 1 is connected with shift-rod 2 by means of short arm 1ᵇ 1ᶜ, pivoted together, as at 1ᵈ, as shown in Fig. 15ᵇ, the said shift-rod 2 will be moved alternately in opposite directions with the movement of shift-rod 1, and as said shift-rod 2 is suitably journaled in frame parts to accommodate such sliding motion, and as the bifurcated rod 6ᵃ is fixed upon the said shift-rod 2, the said reach will be moved alternately in opposite directions with the movement of the said shift-rod indirectly operated from the cam M, and as the forward end of the said reach 6ᵃ is bifurcated to loosely embrace the hollow shaft J² between the collars J³ the hollow shaft J² will be caused to be moved back and forth alternately in opposite directions, which will cause the friction-clutch J⁴, connected therewith, to be operated alternately to impinge and release the flange-wheel L. The particular action of cam-wheel M upon antifriction-roller $m^2$ to time its movements to operate the clutch J⁴ to impinge clutch-wheel L, so that hollow shaft J² will be turned to move the carriage through the cog-wheel J thereon meshing with the run of cogs exactly at the proper time to harmonize with the various other movements of the machine, will hereinafter be fully stated in connection with the operation of the complete device. The movement of the carriage being thus provided for as and in the manner thus generally described to carry the same back and forth across the machine, it is also necessary to provide for the stopping of said carriage exactly at the right points, so that the shifting section of the carriage may be in coincidence or matched relation successively with each one of the series of lower sections $f$, $f^2$, and $f^3$; but the particular means by which the said carriage is so stopped will be hereinafter more particularly described, and at this point attention is called to the parts of the carriage the operation of which facilitate the twisting of the continuous wire carried in the shiftable section thereof with the line wires and cables. We will assume for convenience that the carriage is in such adjustment that the shiftable sections thereof will be in coincidence or matched relation with one of the intermediate lower sections of the series between the two outside sections, (the particular operation of the two outside sections which carry the cable-wires being different from that of the intermediate sections, as they do not derive their turning motion for twisting purposes from the carriage, which will hereinafter be separately and particularly described.) Such being the adjustment, the carriage having been first moved into such position through and by means of the cog-wheel J, hollow shaft J² being turned with the turning of line-shaft H² and meshing with run of cogs on the framework, as just above described, the said hollow shaft J² deriving its intermittent motion from the impinging of the flange of wheel L by the friction-clutch J⁴, forced into such relation therewith by means of reach 6ᵃ, indirectly operated from cam M, and the carriage being stopped in the proper position for the matching relation above referred to, the twisting operation is ready to be performed. When the carriage stops, the partially-cogged wheel X, or the cogged portion thereof, is brought in mesh with cog-wheel Y on the rear end of the particular intermediate section designed to be operated. The partially-cogged wheel X derives its motion indirectly from the line-shaft H², which is, as previously explained, continuously turned by means of the sprocket-chain B, carried under sprocket-wheel H, fixed upon the said shaft, the said turning of partially-cogged wheel X being intermittent, the same as the movement of the carriage, except that when the carriage moves the partially-cogged wheel X is idle, and while the partially-cogged wheel X is moved the carriage is stationary and the cog-wheel J idle. It will be seen from the drawings that the partially-cogged wheel X is fixed upon shaft $X^5$, upon which shaft there is also fixed sprocket-wheel U, which is connected with sprocket-wheel $X^3$, carried upon hollow shaft $U^2$, which said hollow shaft $U^2$ is loose upon the line-shaft $H^2$ and is turned therewith intermittently through the action of the friction-clutch $U^4$, connected therewith, impinging the flange of wheel L, the said friction-clutch $U^4$ being actuated for such impingement by the bifurcated reach 6, the fingers of which embrace the loose shaft $U^2$ between the collars $U^3$, the said reach 6 acting indirectly from the cam M through the shift-rods 1 and 2, in the same manner as explained in their operation to cause the friction-clutch $J^4$ to impinge the rim of wheel L, only in the opposite direction. As the reaches 6 and $6^a$, fixed upon the same shift-rod 2, are shifted to operate the respective friction-clutches $J^4$ and $U^4$ it will be seen that with the shifting of the rod in any given direction one of the friction-clutches will be released from its impinging relation with wheel L, while the other friction-clutch will engage the said wheel, and with the opposite movement of the said shift-rod 2 the aforesaid engaging friction-clutch will be released from the wheel and the aforesaid released friction-clutch will be caused to engage the said wheel. It will therefore be seen that as the friction-clutch $U^4$ engages the rim of wheel L the hollow shaft $U^2$ will be caused to be turned, and with it the sprocket-wheel $X^3$, which said sprocket-wheel being connected with sprocket-wheel U upon shaft $X^5$ the said shaft $X^5$ will be caused to be turned therewith, and with it the partially-cogged wheel X, and, as previously explained, when the carriage is stopped and the sections of the spindle are in coincident relation, the cogged portion thereof will be in mesh with the cogs of the wheel upon the extremity of the particular lower section forming part of the spindle, which turning of said cog-wheel X will cause the cog-wheel $y$ to be turned, and with it the section of the spindle upon which it is carried, and as the half-journals of the shiftable section of the carriage are in coincidence with the half-journals of the section upon which it is carried, a complete journal at both extremities is thus formed and the shiftable section is caused to be turned with the said lower section and may be revolved any number of times desired, the number of revolutions thereof of course depending upon the size of the cog-wheels through which they derive their motion or the proportion of the circumference of the cog-wheels employed upon which there are cogs. The exact manner of intertwisting the wires carried through and in the sections of the spindle thus formed and revolved will be hereinafter more particularly described in connection with the operation of the complete device. As previously explained, the friction-clutches $J^4 U^4$ indirectly derive their motion for the purpose of alternately engaging and releasing the wheel L from the cam M, the cam M deriving its motion indirectly from two different sources, but directly from shaft N, it being designed that the said cam M shall be turned intermittently, regularly, and equal distances, it being particularly designed that it shall move in such manner that the antifriction-roller $m^2$ on shift-rod 1 shall be alternately carried upon the raised face of the cam M, to the maximum points thereof, and then in the depressed portions and exactly at the lowest points therein.

For the purpose of illustrating the manner of turning cam M to actuate the clutches for alternate release and engagement of wheel L by clutches $J^4$ and $U^4$ for alternately moving the carriage and rotating the spindle we will assume that the twisting operation is being performed, and during such operation the cam will be stationary in such position that the antifriction-roller $m^2$ will bear upon the maximum point of one of the raised portions thereof, which position of the said antifriction-roller $m^2$, or, in assuming such position, will actuate the reach 6 through the shift-rods 1 and 2 to cause the friction-clutch $U^4$ to impinge wheel L, and this impingement will be maintained and the spindle rotated directly through partially-cogged wheel X and indirectly through line-shaft $H^2$, as previously explained, and at the same time that the partially-cogged wheel X is turned the partially-cogged wheel $X^2$, fixed upon the same shaft, is turned simultaneously therewith, and as the partially-cogged wheel $X^2$ meshes with the partially-cogged wheel T on shaft P the said cogged wheel T will be turned, and with it the said shaft P, upon which is carried the disk S, as best shown in Fig. 15, which is provided with a notch in the circumference thereof, there being also provided the pin $S^2$, bearing outwardly and at the side of the said notch in said disk S, and as the cogged wheel T is turned the disk S upon the same shaft P is also turned one revolution, the same as the cogged wheel T. In contact relation with disk S is the pentagon R, having circular sides, the said circular sides conforming to the arc of the disk S and within which said circular sides the said disk is designed to bear and turn, and in the turning of the said disk with the cogged wheel T it merely bears around in one of the said circular sides until the notched portion thereof engages one of the pins or angles of the pentagon, and the pin projection $S^2$ contacts with one of the projections $S^3$ from a supplemental plate in contact relation with the pentagon R when the said pentagon is turned a short distance, which also turns the cam M into such position as to carry the antifriction-roller $m^2$ into one of the depressions in said cam, which movement of the antifriction-roller $m^2$ in assuming the position in the depressions of the said cam causes the reaches 6 and $6^a$ to be shifted sidewise and toward the rear portion of the carriage through the action of the shift-rods 1 and 2, which will cause the friction-clutch $U^4$ to release wheel L, which at once stops the operation of turning the spindle and causes the friction-clutch $J^4$ to engage wheel L, which at once sets in motion the parts of the carriage that move the same upon the bed-frame of the machine, and the carriage will continue to move as long as the antifriction-roller $m^2$ rests in one of the depressions of the cam M, which said position insures the engagement of the friction-clutch $J^4$ with the wheel L. The next movement of the cam M is caused indirectly by depending fingers fixed upon the framework carried transversely across the machine just above the carriage and bed-frame. By reference to Fig. 5 the relative location of the said pins may be seen, the same being referred to by 70, and are shown to be located immediately above the rear ends of the lower sections $f$, $f^2$, and $f^3$, there being provided in such relative location one pin for every such section. By reference to the same figure and also to Figs. 15, $15^a$, and $15^b$ it will be seen that 66 refers to a pentagon the position of which when the carriage is stationary is shown in Fig. 5, with one of the corners thereof bearing in a notch in a bar carried upon the transverse frame-piece, there being provided as many notches in the said bar as there are lower sections and in direct vertical alinement therewith, respectively, the said pentagon being provided with five pin projections, as 67, and as the carriage starts to move the pentagon is turned at the same time that the friction-clutch $U^4$ is released, so that one of the sides thereof will slide along in contact relation with the lower edge of the said notched bar, and just as the carriage reaches the next spindle in the series one of the pins on the pentagon 67 turns the same, so that the next corner thereof is carried in the next successive notch in the bar, which turning of the pentagon also turns the cam M, which movement of said cam is sufficient to cause the antifriction-roller $m^2$ to bear upon one of the raised portions thereof, thus operating the friction-clutches, so that friction-clutch $J^4$, that was in engagement with wheel L to cause the carriage to travel, will be released and the friction-clutch $U^4$ will be caused to engage wheel L for the purpose of operating the twisting mechanism, and thus it will be seen that the moving of the carriage is caused indirectly by the movement of cam M, and while the carriage is at rest that the power that rotates the spindle is also indirectly derived from the movement of the same cam.

In order to securely fix the carriage exactly in its proper position while at rest and while the twisting operation is being performed, there is provided the arm 8, as shown in Figs. $15^a$ and 5. This arm is pivoted at one extremity thereof to the framework of the carriage and is carried therewith, the said pivoted arm being provided with the antifriction-roller 76 on its free end, the said arm while the carriage is in motion bearing upon shaft P and immediately adjacent to the ellipsis 7, which is secured to the said shaft at a point without its center, the said ellipsis being provided with the pin projection $7^a$ at a point at or near its edge, and as the shaft P is revolved with the turning of cog-wheel T the said ellipsis is turned and the pin projection $7^a$, striking the arm 8, will bear the same upwardly, causing the antifriction-roller 76 thereon to be carried in one of the series of circular depressions, as 75, provided in a plate carried across the machine above the said carriage in the proper position just above the said arm to receive the roller 76 within the depressions therein, and the ellipsis has just such an adjustment upon shaft P that the pin projection $7^a$ will be in its most elevated position just at the time when the said shaft P ceases to turn, which, as will be seen by reference to Fig. 5, will maintain the said roller 76 upon the bar 8 in the proper position to firmly fix the carriage, and with the turning of shaft P just before the carriage is designed to move the pin $7^a$ is borne downwardly by the turning of the ellipsis 7, thus releasing the bar 8, which will drop back into its normal position, thus freeing the carriage from its fixed relation with the bed-frame. The outside lower sections carried in the bed-frame and referred to as $f^2$ and $f^3$ differ slightly in construction from the intermediate sections $f$, inasmuch as the rear portion $f^4 f^5$ (shown in Fig. 1) extend rearwardly a little farther, a sufficient distance beyond the frame part $A^7$ to provide for the carrying of cog-wheel V upon the end of section $f^3$ and the sprocket-wheel $n$ on the end of section $f^2$, the said ends of sections $f^2 f^3$ being connected by means of pins $g^2$, $g^3$, $g^4$, and $g^5$ with bars E and $E^2$, respectively, which said bars or the rear ends thereof are carried in slots in the forward journals of the spool-carrying frames $d$ $d^2$, the said sections being designed to carry with them in their rotation for the purpose of twisting the cables the said spool-carrying frames $d$ $d^2$ to prevent the twisting of the cable-wires between the rear ends of the twisting-sections and the spools $a$ $a$ $a'$ $a'$, it being designed that the said twisting-sections $f^2$ and $f^3$ shall be rotated simultaneously and during the time when the fabric is being drawn out by the clamp and wound upon the reel, the movement of the said sections being simultaneous with the movement of the clamp and with the movement of the reel and at the time when the carriage is stationary, and while the shiftable section of the carriage, which carries the continuous wire, is in conjunction with one of the said cable or outside sections and is so operated alternately, according to whichever one of the sections $f^2$ or $f^3$ it may be in coincidence with, and when it is in such matched relation with one of the outside sections both of the said sections are rotated, the section with which it is matched supplying the usual two cable-wires, while the shiftable section supplies the continuous wire, and thus as the fabric is drawn out the three wires are twisted together the whole length of the mesh, while the outside section on the opposite side revolves alone to form the usual two-strand cable, and while the operation for moving the carriage in such coincidence with the outside sections and for maintaining it in such fixed position upon the bed-frame is the same as the operation for moving and fixing the said carriage in connection with the intermediate spindles there is a difference in the detailed operation in that the wheel X of the carriage does not mesh with the cog-wheels upon the spindles $f^2 f^3$; but the particular manner in which the outside sections are turned from the source of power will hereinafter be more particularly explained.

Carried upon the forward face of the frame-piece $b^2$ is a supplemental frame part, within which are pivotally carried pins $a^2 a^2$, provided at their lower ends with fingers A, projecting at right angles therewith in their normal positions and parallel with each other, with their free ends thereof pointing toward the carriage. Fixed upon the same pins $a^2 a^2$, at their upper extremities, are the cogged plates 4 $4^a$, designed to mesh with each other, and connected with cogged plate 4, at its pivotal point, is the short arm $3^a$, which is connected with the eccentrically-disposed pin $3^b$ on disk S by means of the bar 3, this device being purposed to be operated so that the fingers A will, one or the other, according to the direction in which the carriage is being run, engage the continuous wire that is wound from the spool in the shiftable section $k$, and when the fingers are so thrown upwardly by the turning of the disk S when the twist is being made the strand-wire and continuous wire will be carried parallel with each other some little distance in front of the twister-journals, so as to accommodate the twisting of the two wires together closely in the form of a cable. The particular and detailed operation of these various parts just above and previously referred to as relating to the carriage, its several functions, and those that control and provide for its intermittent movement will be hereinafter more particularly explained in connection with the operation of the complete device.

The various working parts of the machine derive their power and motion directly or indirectly from the line-shaft $23^d$, the said shaft having fixed thereon the belt-wheel 28, which is designed to be turned by belt 25. The rotating clamp and the reel, which are operated simultaneously and intermittently, derive their motion and power primarily from the line-shaft $23^d$ through the sprocket-wheel 23, secured thereon at its forward end, which is connected with shaft $22^a$ by means of a sprocket-chain running over sprocket-wheel 22, keyed thereon, the said shaft $22^a$ being suitably journaled in the framework of the machine and having fixed thereon the beveled gear-wheel 21, which meshes with beveled gear-wheel 20, carried upon the transverse shaft $21^a$, suitably supported in the framework of the machine, the said transverse shaft having also fixed thereon the sprocket-wheel 19, which is connected with sprocket-wheel 18 upon transverse shaft $18^a$ by means of a sprocket-chain, and upon the said transverse shaft $18^a$ is also fixed the sprocket-wheel 17, which is connected by sprocket-chain with sprocket-wheel 16 on shaft $16^a$, the said shaft being suitably journaled in the framework of the machine, and having also keyed thereon the cog-wheel 15, which said cog-wheel meshes with cog-wheel 14 on shaft $28^b$, which is the same shaft that supports and turns the revolving clamp, and through the connection of these various elements in the manner specified the said clamp is caused to be turned to perform its function in the operation of the machine, the intermittent motion of the same being controlled by disk-wheel 88, which operates arm $88^a$, to actuate the friction-clutch connected with hollow shaft $23^a$, upon which sprocket-wheel 23 is carried, the said arm $88^a$ being designed to be actuated in such a manner as to alternately engage and release the clutch-wheel 24, so that the hollow shaft $23^a$ will alternately be at rest and in motion, which will transmit a corresponding intermittent movement to the said rotating clamp.

The reel which, as previously described, is designed to be turned at the same time the revolving clamp is in motion for the purpose of rolling up the fabric as fast as it is drawn out by the said clamp derives its motion, primarily, from the same line-shaft $23^d$ and through the same sprocket-wheel 23 upon the hollow shaft $23^a$, the movement of the said sprocket-wheel 23 being transmitted to sprocket-wheel 22 on shaft $22^a$, upon which said shaft the beveled gear-wheel 21 is fixed, which said beveled gear-wheel meshes with beveled gear-wheel 20 upon the transverse shaft $21^a$, upon the extremity of which said transverse shaft is carried the face-plate 42, which is provided with the eccentrically-disposed pin $42^a$, with which is connected the reach 43. The turning of the said disk 42 in the intermittent operation of these particular connected parts of the machine with the line-shaft $23^a$, just above referred to, causes the reach 43 to be moved backwardly and forwardly for the purpose of imparting a rotary motion to the reel through and by means of the various intermediate parts provided to control and graduate its movements proportionately as the bundle increases in diameter, these particular intermediate parts and their operation having been referred to previously in this specification. The intermittent movement of the reel is controlled by disk-wheel 88, which also, as previously stated, controls the movement of the clamp, and in the same manner the detailed operation of the said disk 88 to so control the said operations of the clamp and reel respectively will hereinafter be more particularly described.

As previously stated, the shiftable carriage, which is designed to travel back and forth across the machine and upon the bed-frame, which carries the lower sections $f$, $f^2$, and $f^3$ to provide for the successive matching relation of the shiftable section $k$ in the said carriage with the respective spindles of the series by the said carriage being stopped at intervals in its passage, so that it will be alternately in motion to take the successive steps and at rest during the interval while the twisting operation is being performed, derives its motion and power directly from sprocket-chain B; but the said power and motion are derived, primarily, from the line-shaft $23^d$, upon which are carried the clutch-wheels 24 and 127, which also carries hollow shaft $25^a$ and $26^a$, which support, respectively, the sprocket-wheels C C'.

$25^a$ is a short shaft suitably supported in journals, as $24^a$, in plate $24^b$, upon the respective ends of which are carried the cog-wheels 25 and 26, the sprocket-wheel 25 being connected with sprocket-wheel C' by means of a sprocket-chain and is designed to be turned with the said sprocket-wheel C'. The sprocket-chain B, which connects directly with the carriage, is carried over sprocket-wheel C and under sprocket-wheel 26 and around the idle sprocket-wheel E. The said sprocket-chain B, continuing around and underneath the said sprocket-wheels named, passes over idle roller G on the framework of the carriage, under sprocket-wheel H on the line-shaft $H^2$ of said carriage, over idle sprocket-wheel I, and thus onward to the other side of the machine, and is there carried under and around sprocket-wheel D and returns to be carried over sprocket-wheel C. As the sprocket-chain B imparts directly the moving power to the carriage, it is necessary, in order that the said carriage may be moved in opposite directions as it travels from one side of the bed-frame on which it is supported to the other extremity thereof and then returns, that the said chain shall be moved alternately in opposite directions, such alternate direction of movement being obtained by deriving the power for moving the same from different sources—that is, by the engagement by separate clutches with clutch-wheels on the line-shaft $23^d$, which directly operates independent elements, it being purposed that said separate clutch-wheels shall engage and release alternately—that is, that the two said friction-clutches $25^a$ and $26^a$ shall be operated simultaneously through suitable mechanism in such manner that when one is in engagement with one clutch-wheel the other will be released from the other, and the reverse—and by reference to Figs. 1 and 16 of the drawings the particular manner by which it is released may be seen.

We will suppose for convenience that friction-clutch designed to be operated in connection with hollow shaft $26^a$ is in engagement with clutch-wheel 24, at which time the friction-clutch connected with hollow shaft $25^a$ will be loose in friction-wheel 27 and the hollow shaft 26 by its friction-clutch engagement with clutch-wheel 24 on shaft $23^d$ will then be turned with said shaft, which movement will cause the chain B to be run in the particular direction the said line-shaft is turned. This movement is continuous, the clutch being in continual engagement with clutch-wheel 24 until the carriage shall have passed through the successive steps in the movement of the carriage the entire width of the machine in a given direction, and when it has so traveled the entire width of the machine, it being then in coincidence with one of the outside sections which carry the cable-wires, and after the twist has been made at this point through suitable mechanism the clutch, which engages wheel 24, is released and at the same instant the clutch on hollow shaft $25^a$ engages clutch-wheel 127, which turns the said hollow shaft $25^a$ with the line-shaft, and as the sprocket-wheel C' thereon is connected with sprocket-wheel 25 the said sprocket-wheel 25 is turned and with it the shaft $25^a$, upon the opposite extremity of which is carried the sprocket-wheel 26, underneath which sprocket-chain B runs, which will impart to the said sprocket-chain B the opposite direction of movement from that imparted to it by the movement of sprocket-wheel C with the line-shaft. The sprocket-wheel C during the operation from its connection with the line-shaft runs idle upon the said line-shaft, this direction of movement of said chain B being continued until the carriage has traveled through its successive steps and in the opposite direction from the former movement the entire width of the machine, the movement of the said chain B in either direction being continuous, notwithstanding the fact that the carriage is successively stopped and remains at rest for short intervals while the several twists are being made.

The intermittent movement of the carriage and the twisting of the wires together while the said carriage is at rest are controlled by mechanical parts mounted thereon, which all derive their power and movement from the line-shaft $H^2$ thereon, which is continuously rotated by the sprocket-chain B being carried under sprocket-wheel H. All of the several operations of the said carriage, including both the movement thereof and the turning of the spindles formed by the successive matching relation of the shiftable section of the carriage with the intermediate sections of the series in the bed-frame to perform the several twists, derive their motion and power directly from the sprocket-chain B, and while the sprocket-chain B moves the carriage in proper position for matching relation of the shiftable sections thereof with the outside section the same as it moves the carriage for matching relation with the intermediate sections other elements are employed to operate them to cause the said sections to be turned to form the cables, and the power to turn the spindle so formed is derived from a different source.

The movements of the hollow shafts $25^a$ $26^a$, with which the friction-clutches are connected, designed to engage, respectively, the friction-wheels 24 and 127, are controlled by reaches 148 and $148^a$, connecting, respectively, by suitable fingers upon one end thereof, with the hollow shafts $25^a$ and $26^a$ between the collars $21^b$ and $21^c$ and with the free ends thereof in contact relation, or the antifriction-rollers $79^a$ and $89^a$ thereon, with the edges of disks 79 and 89 carried upon shaft 87, the operation of which said disks to effect through the said reaches 148 $148^a$ the movements of the said hollow shafts $25^a$ $26^a$ to cause the friction-clutches thereon to alternately engage and release the clutch-wheels with which they are designed to engage will hereinafter be more particularly described in connection with the description of a special automatic device and in the description of the operation of the complete machine.

As previously stated, the outside sections $f^2$ $f^3$ of the series of sections carried in the bed-frame are operated by devices especially provided for that purpose and the said sections are each operated independently, but simultaneously. The particular manner of such operation may be seen by reference to the drawings, and the particular operation of section $f^2$, which carries at its rear extremity the sprocket-wheel $n$, may be seen by reference to Figs. 1 and 2, in which said figures it will be seen that the said sprocket-wheel $n$ is connected with sprocket-wheel $m$ on line-shaft $23^d$, which said sprocket-wheel $m$ is carried upon hollow shaft $m^2$, with which is connected the friction-clutch $m^3$, designed to operate in connection with friction clutch-wheel 127, and when the said friction-clutch $m^3$ engages clutch-wheel 127 the sprocket-wheel $m$ will be turned, which will transmit a corresponding motion to sprocket-wheel $n$ through and by means of the sprocket-chain connection, which will cause the section $f^2$ to be turned, and if the carriage is in such adjustment that the shiftable section therein is in coincidence therewith the complete spindle will be turned to form the cable, the continuous wire being twisted together with the strand-wires when in such coincident relation; but if the carriage is at the other side of the machine and in coincidence with outside section $f^3$ merely the section $f^2$ will be turned. As the section $f^2$ is turned through the sprocket-chain connection of sprocket-wheel $n$ with sprocket-wheel $m$ the spool-carrying frame D will also be turned because of the bar E connecting the said section $f^2$ or the rear end thereof with the spool-carrying frame $d$, the detailed manner of such connection having previously been explained. The section $f^2$ is operated intermittently, it being designed that it shall only be turned while the fabric is being drawn out, and when the shiftable section of the carriage is in coincidence therewith or with section $f^3$ and its operation is controlled through and by means of reach 139, having suitable fingers upon one end thereof designed to embrace hollow shaft $m^2$ between the collars $m^4$ thereon and with the free end of the said reach or an antifriction-roller thereon designed to contact with the peripheral edge of disk 90, and the movement of this said arm 139 is also designed to control the movements of the dog 137, purposed to engage and hold sprocket-wheel $n$ through a pin projection therefrom when the said sprocket-wheel is not in motion, as will be seen by reference to Fig. 16, and the connection between the said dog 137 and reach 139 may be followed by reference to the same figure, in which strap 138 is shown pivotally connected with strap 140, which said strap 140 connects with the short pivoted lever 150, which said short lever connects with reach 136, which said reach connects with dog 137, it being purposed that through its connection with reach 139 the dog 137 shall be operated therefrom to release sprocket-wheel $n$ while the twisting operation is being performed, and to engage the said sprocket-wheel at the conclusion of such twisting process to stop and retain the said sprocket-wheel and section $f^2$ connected therewith in proper position. The particular manner by which these movements (that of turning the section to perform the twist and the engagement of sprocket-wheel $n$ by dog 137) are timed and controlled through the disk 90 will hereinafter be more particularly explained.

The particular manner of turning section $f^3$, which carries the wires for the cable, upon the left side of the fabric being formed may be seen by reference to Figs. 1, 2, 3, and 16 and for detailed parts by reference to Figs. 5, $17^a$, $17^b$, and $17^c$. It will be seen in these figures that section $f^3$ carries upon its rear end the gear-wheel V and has connected therewith, in the same manner that spool-carrying frame $d$ is connected with sprocket-wheel $n$, the spool-carrying frame $d^2$—that is, by means of the connecting-bar E'. Meshing with the said cog-wheel V is the cog-wheel U, carried upon shaft $U^2$, suitably journaled in the framework, upon which said shaft there is also carried loosely the sprocket-wheel P, being provided with pin projections $P^2$ $P^2$ $P^2$ from one face thereof, and also the disk 130, fixed thereon and bearing close to sprocket-wheel $p$ and provided with arm 132, centered, as at 132$^a$, and provided with a suitable bearing-spring to hold the said arm in proper position, but enabling the same to be pushed backwardly some little distance, the disk 130 being provided with a peripheral notch designed to be engaged by dog 131, pivoted upon the framework of the machine. The sprocket-wheel $p$, as shown, is connected with sprocket-wheel O, fixed upon the line-shaft, which turns continuously therewith and transmits a corresponding rotation to sprocket-wheel $p$. The said sprocket-wheel $p$, running loose upon shaft $U^2$, is purposed to be engaged and released alternately by the mechanism connected with disk 130 to be engaged by the same when it is designed that the twister-section $f^3$ shall be rotated to form the cable as the fabric is being drawn out and to be released as soon as the cable has been formed and the carriage is ready to start back across the machine, the said section being turned either alone or in matched relation with the shiftable section of the carriage, the same as in the operation of twister-section $f^2$. The particular manner of controlling the said engagement between the sprocket-wheel $p$ and the disk 130 may also be seen by reference to Figs. 1, 2, 3, and 16, and particularly by reference to Figs. 5, 17$^a$, 17$^b$, and 17$^c$, in which said figures it will be seen that the long arm 34, which is suitably pivoted upon the framework of the machine or the projections therefrom, is angled at its upper extremity, as shown in Fig. 5, with the upper end thereof or an antifriction-roller thereon bearing against the peripheral edge of disk 91, the lower extremity of the said long arm 34, provided with the short arm 33, which is designed alternately to engage and release arm 132 on disk 130 in such manner that when so engaged the said short arm 132 will be pushed into such a position that the pin projections $P^2$ upon sprocket-wheel $p$ will not contact therewith, which will provide for the free movement of sprocket-wheel $p$ upon shaft $U^2$ without turning the said shaft, and when the long arm 134 is operated to withdraw the short arm 133 from engagement with short arm 132 on disk 130, the short arm 132 will assume such a position as to contact with one of the pins $P^2$, which will cause the said disk to be turned and with the shaft $U^2$, upon which it is fixed, which in turn will rotate the cog-wheel U thereon, which, meshing with cog-wheel V upon the rear end of spindle $f^3$, will cause the same to be turned, thus rotating the spindle for the purpose of forming the cable. This particular manner in which disk 91 is operated and timed to shift arm 134 to perform its function of engagement and release between disk 130 and sprocket-wheel $p$ will hereinafter be more particularly explained.

Numerous references have hereinbefore been made to disks 88, 79, 89, 90, and 91 upon line-shaft 87. This said line-shaft 87 is operated to turn the disks thereon to perform their several functions indirectly from the line-shaft 23$^d$ and the particular means and mechanism employed for such operation may be seen by reference to Figs. 3, 18, and 18$^a$. In Fig. 3 it will be seen that the sprocket-wheel 94 is fixed upon the line-shaft 23$^d$ and is continuously rotated therewith and is connected by sprocket-chain with sprocket-wheel 95, carried loosely upon auxiliary shaft 97, said sprocket-wheel 95 being provided with pin projections 98 from one face thereof, the said sprocket-wheel 95 being therefore turned continuously. Upon the same shaft 97 there is also fixed the disk 99, provided with notch 116 in the peripheral edge thereof, and having upon one face the antifriction-roller 100, which acts as a lug and is journaled upon a suitable pin on a radial line passing through the center of the notch 116 and the center of shaft 97. Upon the opposite face of the said disk there is provided the arm 101, centered at 102 and provided with spring 1003 for maintaining the said arm in proper position and to facilitate a slight yielding motion thereof.

1006 is a disk fixed on shaft 97 and provided with a peripheral notch designed to be engaged by a suitable pawl provided useful in maintaining disk 99 in proper position and to resist a tendency to backward turning, as will hereinafter be more fully explained.

104 is a pivoted rack, being centered at two points, as at 117 and 118, to permit of a side and a forward-and-backward movement of the same, it being designed that the said rack in its side and backward-and-forward movements shall control the movements of the said disk 99, the said disk 99 being designed to control the movements of shaft 87 through and by means of the radial plates or arms 103, octagonal disk 115, disk 112, and straps 110, all having a fixed relation with said shaft 87 or bearing around the same. In the operation of disk 99 we will assume for convenience that the rack 104 is in position shown in solid lines, in which said position the antifriction-roller 105 on one of the arms of the rack is shown disengaged from arm 101 of the disk, and the antifriction-roller 107, also on an arm of said rack, is shown bearing against one of the projecting ends of straps 110 or the inside curved end thereof, which is the starting-point in the operation of turning, and the short arm 101 thus disengaged will be drawn upwardly by the spring 1003, so that a portion thereof will be thrown outwardly to engage with one of the pin projections 98' on sprocket-wheel 95, which will cause the said disk to be turned with the said sprocket-wheel, and as the disk turns, with the circumferential edge thereof in matched relation with one of the circular depressions in the octagonal disk 115, the lug 100 thereon will be caused to contact with one of the radial arms or plates 103 on shaft 87, which will turn the same, one of the projecting corners of octagon 115 being carried in the notch 116 of the said disk as they turn together, which will carry the circumference of disk 99 into matched relation with the next succeeding depression in the octagonal disk, such matched relation being provided to maintain the arms 103 in proper position to be engaged by lug 100 as disk 99 is again turned, and to facilitate in the turning of disks intervening projections or corners are provided between such depressions in said disk 115 to match with notch 116 in disk 199, one revolution of the said disk causing a one-eighth revolution of shaft 87, and two revolutions of the said disk causing the said shaft 87 to be turned one-fourth around, the number of times the said disk 99 shall be turned and the distance the said shaft 87 shall be turned at any one time being controlled by straps 108 and 109. When the disk 99 has revolved the desired number of times to obtain the required distance of turning of shaft 87, the straps 108 and 109, or one of them, at a given time, by means of notches in their upper edges, is caused to engage the depending lug 104ᵃ on rack 104, which will draw the said rack sidewise and releases roller 107 from its engagement with the inner curved face of strap 110, when the said rack will assume the position indicated in dotted lines, with the antifriction-roller 107 bearing against the outside curved edge of strap 110 and the antifriction-roller 105 bearing over short arm 101, which position of the rack and roller 105 is assumed when the disk 99 ceases to rotate, the momentum of the disk before it is finally stopped being sufficient to cause the arm 101, because of its violent contact relation with roller 105, to be sufficiently depressed to free the extended portion near its pivotal point on the said disks from engagement with the particular pin on sprocket-wheel 95 with which it has been in contact during the turning of the said disk, and the arm 101 being so stopped the shaft 97, on which it is fixed, is prevented from turning backward by the disk 1006, or the peripheral notch thereof being engaged by a suitable pawl, thus leaving the cog-wheel 95 to rotate freely upon shaft 97 without turning the same and leaving disk 99 in a stationary position, which said stationary position will be maintained, both of the disk 99 and the shaft 87, until one of the bars 108 or 109 engages lug 104ᵃ on rack 104 and frees the roller 107 from contact with outer edge of strap 110 and throws it into position at the inner curved edge thereof and throws roller 105 outwardly, thus releasing short arm 101 on disk 99 to allow it to spring into such position that a portion thereof will again engage with one of the pins 98 on sprocket-wheel 95, which will cause the disk 99 again to be turned for the purpose of causing shaft 87 to be further turned. The particular manner in which bars 108 and 109 are operated to cause the said rack 104, through antifriction-rollers 105 and 107, to alternately engage and release the arm 101 on disk 99 and the straps 110 for the purpose of regulating the movement of shaft 87 may be seen by reference to Figs. 5, 16, and 17, in which said figures it will be seen that bar 108 is carried at right angles with and immediately below the said rack 104 and bears lengthwise of the machine and forwardly and connects with bar 72 by means of depending arms from the adjacent ends of the said bars 108 and 72, suitably connected at their extremities for pivotal relation, said bar 72 being pivoted to the framework of the machine at its other extremity, this said bar 72 being located, as shown in Fig. 5, at a point immediately above the pivoted arm 8 upon the carriage, the said pivoted arm being provided with the supplemental arm 8ᵃ, which is designed to contact with lugs, as 8ᵇ, upon said bar 72, they being located properly thereon for such contact relation at the proper time, and when the said arm 8ᵃ is thrown upwardly, the said supplemental arm 8ᵃ being in position just below one of the lugs 8ᵇ, the bar 72 will be raised by contact of the expanded head of the supplemental bar 8ᵃ with one of the lugs 8ᵇ and is caught and held in this position by angle-bar 72ᵃ, which is notched at one end to engage pin 72ᵇ upon the said bar 72, this upward movement of the said bar 72 causing bar 108 to be moved forwardly, and in being so drawn forwardly the notch therein in engagement with lug 104ᵃ on rack 104 will cause the said rack to be drawn a sufficient distance therewith so that the antifriction-roller 107 thereon will be relieved from contact relation with the outside curved edge of strap 110, and when so relieved the spring 111 will throw the rack forwardly and slightly sidewise into the position shown in solid lines in Fig. 18, in which position the antifriction-roller 107 will bear adjacent to the inside curved edge of strap 110 and against the face of disk 112 and the antifriction-roller 105 will be caused to be released from engagement with short arm 101 on disk 99, which will relieve the said short arm, allowing the same to spring upwardly and throw the lower portion thereof outwardly to engage one of the pins 98 on sprocket-wheel 95, which completes the connection with said wheel to control the alternate movement of disk 99, this position of rack-bar 72 being maintained for an interval of time and until in the movement of the carriage across the machine and in the matching of the shiftable section therein with a particular lower section, and in fixing the carriage in this position the roller 76 on pivoted arm 8 is thrown upwardly and in such movement strikes one of the angle-arms of bar 72ᵃ, causing the same to release pin 72ᵇ, which will allow the bar 72 to drop into its normal position, which movement will actuate bar 108 to be thrown rearwardly, so that the notch therein will engage the lug 104ᵃ on rack 104 and will be maintained in this position for a short interval until it is actuated forwardly by the rack-bar 72 being again raised, and while it occupies this rearward adjustment with the notch therein in engagement with lug 104ᵃ on rack 104 the said rack will occupy the position shown in dotted lines in Fig. 18, in which position the antifriction-roller 107 will bear against the outside curved edge of strap 110 and the antifriction-roller 105 will be in engagement with short arm 101 on disk 99, and this position will be maintained until the movement of one of the bars 108 or 109 has been actuated forwardly to draw the rack 104 sidewise. In the same figures it will be seen that notched bar 109 is also carried underneath rack 104 and is designed to alternately engage and release lug 104ᵃ thereon, as previously stated, this said arm 109 being pivotally connected, as at 121, with bar 118, pivoted upon the framework, as at 120, which said bar 118 is connected with bar 117, as at 119, which said bar 117 is connected with bar 113, as at 116, the said bar 113 being pivoted to the framework, as at 114, and is designed to contact with pins 115 on disk 112ᵃ, which said disk is carried upon shaft 28ᵇ, upon which the rotating clamp is carried and derives its motion therefrom. In the turning of the disk 112ᵃ the pins 115 thereon contact with pivoted depending bar 113, actuating through the above-named connections bar 109, as one of the pins bears against the lower end of bar 113, pressing it rearwardly, which will cause the upper end thereof to be thrown forwardly, carrying with it bar 117, which also draws 118 forwardly or the end thereof connected with said bar 117, actuating the opposite extremity rearwardly, and as bar 109 is pivoted to said bar 118, as at 121, a corresponding rearward movement will be imparted thereto, which will cause the said bar by means of the notch in the upper face thereof to engage the lug 104ᵃ on rack 104, and as the pin on disk 112 releases bar 113 the respective parts connecting with bar 109 will spring back into their normal position through the action of coil-spring 135, which movement will cause the bar 109 to be drawn forwardly, carrying with it the rack 104, which said movement will act upon roller 107 to effect the operation of disk 99 the same as the movement of bar 108 just previously explained, the movements of the said bars 108 and 109 being so timed as to operate each respectively at different and proper times to engage and release the said rack 104, as will hereinafter be more fully described in connection with the description of the operation of the complete machine.

The disk-wheels 88, 79, 89, and 90, as previously explained, are turned and controlled indirectly from line-shaft 23ᵈ, acting through sprocket-wheel 95, disk 99, and parts 103, 115, and 110 and 112 upon shaft 87, upon which said shaft are also carried the said disks for the purpose, as previously stated, of applying the power to and directing the movement of the various working parts of the machine, the general form and manner of notching these said disks being seen in detail in Fig. 21, said disks being designed to be fixed upon shaft 87 by means of set-screws and adjusted in just such position thereon as to cause in their movement the antifriction-rollers upon the several reaches to alternately travel upon the raised portions and then in the depressed portions exactly at the proper times to actuate the several friction-clutches with which they are indirectly connected.

In Figs. 4 and 5 there is shown a recording device or meter which is referred to by number 78, it being designed that a short lever connected with the working parts of the meter shall extend out so as to connect with pins upon one face of disk 79, and as the said disk 79 is turned the number of its revolutions or, as the figure would indicate, the number of its half-revolutions would be recorded by the meter. There is also provided and carried immediately below disk 79 the brake device 80, an arm thereof being designed to contact with the pins upon said disk, so that a surface of said brake 80 will bear upon chain B and act as a brake or stay to effect the movement of said chain, the detailed construction of which said brake is shown in Fig. 6.

Hereinbefore we have referred to the various parts of the complete machine and pointed out the detailed construction and operation of said various working parts to perform their several functions in the complete operation of the machine.

We will now describe the operation of the complete machine for the purpose of making the wire-fence fabric. It is first necessary in the operation of the machine that the spools *b b*, &c., shall be supplied with wire to be wound thereon, the said spools carried in their relative positions shown in the drawings, as many spools being supplied as there are intermediate strands in the particular width of fabric being woven. The wires from the said spools are carried forwardly and through the particular lower sections *f* with which they aline, the said wires coming out of the said sections through the eccentrically-disposed perforations in the forward half-journals thereof and passing forwardly are designed to be engaged by the rotating clamp. The spools *a a a' a'*, supplied with wire for cable-wires, are carried in frames *d d²*, the wires therefrom being carried through perforations *l* thereof, and thus forward through the respective outside sections *f² f³*, coming out of the eccentrically-disposed perforations in the forward half-journals thereof, respectively, and are engaged by the rotating clamp the same as the wires passing through the intermediate sections. The spool *g*, containing the continuous wire, is placed in the framework of section *k*, and the wire therefrom is passed through an eccentrically-disposed perforation in the forward half-journal of the shiftable section in which the spool is carried, and presuming for convenience that enough fabric has already been woven to pass around the revolving clamp over roller 37 and around the reel-roller or in such a manner as to be connected with the said reel, and that the fabric has just been drawn out by the revolving clamp and the part drawn out and wound upon the reel, the carriage during such operation being in adjustment at one side of the machine, and we will assume for convenience that it is in adjustment at the right-hand side thereof as viewed from the forward part of the machine when it will be desired in the operation of the machine that the carriage shall be moved to the left, at which time in the operation the line-shaft $23^d$ will have acted through the intermediate sprocket-wheel 95 by connection with disk 99, acting upon intermediate elements upon shaft 87, will turn the said shaft 87, so that disks 79 and 89 will also be turned in such manner that the antifriction-rollers $79^a$ and $89^a$ will be carried in one of the depressions in disk 89 and roller $79^a$ upon one of the raised parts of disk 79, which will cause, respectively, the reaches $148^a$ and 148, because of their pivotal connection with the framework, to be shifted so that friction-clutch on hollow shaft 26 will release clutch-wheel 24, leaving hollow shaft 26 to run loose on line-shaft $23^d$, and friction-clutch on hollow shaft $25^a$ will engage clutch-wheel 127, which will cause the cog-wheel $C^2$ on said hollow shaft to be turned, which will turn sprocket-wheel 25 through its sprocket-chain connection therewith, which will cause shaft $25^a$, upon which sprocket-wheel 25 is carried to be turned, which will likewise turn sprocket-wheel 26, under which sprocket-chain B is carried to be turned, and assuming that the line-shaft $23^d$ is turning in the direction indicated by arrow on belt 25 then the sprocket-wheel 26 will be turned in the same direction, which will give a corresponding opposite direction of movement to sprocket-chain B, and as sprocket-chain B is carried over sprocket-wheel D on the framework and passing around connects with the carriage by passing over loose sprocket I and under sprocket-wheel H and over idle roller G the sprocket-wheel H will be caused to be turned, and as the said sprocket-wheel is fixed upon line-shaft $H^2$ of the carriage the said line-shaft will be caused to be turned, and as it is designed at this point that the carriage shall be moved, and as such movement would start at the conclusion of the twisting operation, the cam M, which controls the movements of the carriage itself and of its parts, will have been shifted into such position that the antifriction-roller $m^2$ on shift-rod 1 will rest in one of the depressions in the peripheral edge of the said cam, and the movement of the said antifriction-roller $m^2$ in assuming this position will act upon shift-rod 1 to draw shift-rod 2 rearwardly, which will cause the reach $6^a$, carried thereon, which connects with hollow shaft $J^2$, to move the friction-clutch $J^4$ thereon to engage clutch-wheel L, fixed on shaft $H^2$, which said engagement will cause the hollow shaft $J^2$ to be turned with the turning of the said line-shaft through the action of sprocket-chain B upon sprocket-wheel H, and as the cog-wheel J is fixed upon the said hollow shaft $J^2$, and as it is in mesh with the run or plate of cogs K, the turning of the said cog-wheel J will cause the carriage to travel in the opposite direction from which the said cog-wheel J is turned, and as the cog-wheel J will be turned to the right the carriage will be moved to the left. As this movement begins the pentagon 66 will be turned slightly, and one of the sides thereof will be carried along upon the lower face of plate 68 of the framework 74, which is shown in Fig. 5 with a section broken out and turned endwise, and at the time in the movement that the carriage is almost in matched relation with the next successive section of the series one of the depending fingers 70 that is directly above the said section with which matching relation is designed will contact with one of the pins 67 of the pentagon 66, which will turn the same slightly, which movement will throw one of the corners thereof into one of the notches 69 in frame part 68, which will place the carriage in such a position that the shiftable section therein carried will be in matched relation with the said lower section, and the turning of the said pentagon 66 by contact of finger 70 with one of the pin projections 67 thereof will cause the shaft N to be turned, which will cause the cam M to be shifted in such position that the antifriction-roller $m^2$ on shift-rod 1 will be in adjustment upon the maximum raised point of one of the raised surfaces of the said cam, and the movement of the said antifriction-roller $m^2$ in assuming such position will cause the shift-rod 1 to be so turned as to act upon shift-rod 2 to push the same forwardly, which will cause the friction-clutch $J^4$, through the reach $6^a$, to be released from clutch-wheel L, the engagement with which caused the carriage to move, which will at once stop the carriage, this movement being simultaneous with that of the adjustment of one of the corners of the pentagon 66 within one of the notches 69 of the frame part 68, and the same movement derived from cam M to shift the rods 1 and 2 to release clutch $J^4$ from engagement with wheel L will cause the friction-clutch $U^4$ on hollow shaft $U^2$, through the reach 6, connected with bar 2 and with said hollow shaft, to engage friction-clutch wheel L, so that the hollow shaft $U^2$ will be rotated therewith, and as the said hollow shaft is turned the sprocket-wheel $X^3$ thereon will also be turned, which will cause a corresponding rotary movement of sprocket-wheel $U^5$, connected therewith by sprocket-chain, and the sprocket-wheel $U^5$, being fixed upon shaft $X^5$, will cause the same to be turned, and as just at this point the cogs of the partially-cogged wheel $X^2$ are in mesh with the partially-cogged wheel T and the direction of turning such as to cause their continuous meshing for an interval of their respective circumferences with the turning of partially-cogged wheel $X^2$ with shaft $X^5$, the partially-cogged wheel T being thus caused to be turned, which will turn shaft P, upon which is carried the ellipsis 7, which will cause the pin $7^a$ upon one edge of the eccentrically-disposed ellipsis 7 to be thrown upwardly, causing the same to contact with bar 8, which will throw the roller 76 thereon into engagement with one of the circular depressions 75 in bar 73, which insures the secure holding of the carriage in proper position. The partially-cogged wheel X, which is shown in detail in Figs. 19, $19^a$, and $19^b$, is thrown by the forward movement of the carriage just before stopping with the cogs thereof or one section of the same in mesh with cog-wheel $y$ on the particular spindle with which the shiftable section is matched, and the turning of shaft $X^5$, which begins just as the carriage stops, causes the partially-cogged wheel X to be turned, which will cause the section on which the cog-wheel in mesh therewith is carried to be turned, and with it the shiftable section $k$ of said carriage, which will form the complete spindle, and the wires carried, respectively, through the lower section and shiftable section so matched and coming out at the forward ends thereof through the eccentrically-disposed perforations will be caused to be twisted together, and to facilitate in this twisting operation and to provide for the said wires being twisted together in the form of a short cable there is provided the fingers A, pivoted in a suitable framework upon the carriage, which are designed, as previously explained, to engage the continuous wire, one finger to engage the said wire when the carriage is running in one direction and the other to engage the same when it is running in the opposite direction, these said fingers being designed to be actuated inwardly through the action of the segmentally-cogged plates 4 $4^a$, suitably connected with disk S on shaft P, the said disk S being turned with shaft P at the same time that ellipsis 7 is thrown into position to operate bar 8 to fix the carriage in proper position and to operate the cam M to release friction-clutch $J^4$ to stop the carriage and to start the twisting operation, and as the fingers $a$ are thrown inwardly with this movement of disk S through arm 3, connected eccentrically therewith, and the carriage having been moved to the left the finger at the right-hand side will engage the continuous wire and draw out the continuous wire sufficiently from the shiftable section to provide some little space between the end of the spindle and the fingers A, and the twist is then made of the wires thus carried through the intermediate space, forming a short cable. The twisting operation having been performed, the number of said twists of course being controlled by the relative sizes and proportions of partially-cogged wheels X and $y$, and in forming the twist the cog-wheel $y$ is caused to traverse all of the cogs on partially-cogged wheel X, and as the said cogs have been traversed the strap 10 on said partially-cogged wheel X contacts with projection 9 on cog-wheel $y$, which forces the said cog-wheel in the relative relations shown in Figs. 19 and $19^a$, with the smooth surface thereof in matched relation, but not in such close relation as to prevent the moving of partially-cogged wheel X from such matched relation as the carriage is moved to the next successive section. In the operation of partially-cogged wheel $X^2$ for the purpose of turning partially-cogged wheel T it will be seen by reference to Fig. $15^b$, in which the particular forms of each wheel is shown in their connection, that there are just enough cogs on wheel $X^2$ to rotate cog-wheel T once around, when the smooth portion of the respective cog-wheels will be thrown in coincidence and will so remain until the smooth circumference of wheel $X^2$ has been traversed, with the turning of the shaft on which it is carried, and the cogs of the respective wheels are again thrown in mesh. Just at the conclusion of the twisting operation, by the proper meshing relation of the cogs on the partially-cogged wheel $X^2$ of the cogs on partially-cogged wheel T, the shaft P, as before explained, is turned, and at the time, as above stated, when the twisting operation is just being concluded the pin $S^2$, projecting from the said shaft and on the side of disk S, in such turning strikes one of the pin projections $S^3$, so that the pentagon R will be thrown into such position that one of the points thereon will engage with the notch in disk S, in which position and when so matched the said pentagon R and disk S will be stopped, and the assuming of such position will cause the cam M to be shifted and maintained in such a position that the anti-friction-roller $m^2$ will be carried from the raised position upon the raised portion of the said cam to one of the depressions in the said cam, thus causing the shift-rod 1 to draw shift-rod 2 rearwardly, which will release friction-clutch $U^4$ from its engagement with clutch-wheel L, thus stopping the movement of these elements operated from hollow shaft $U^2$ through sprocket-wheel $X^3$, and the same movement will cause friction-clutch $J^4$ to engage friction-clutch wheel L to operate hollow shaft $J^2$ to cause the carriage to be moved through its next successive step, and this operation is continued, the carriage being moved successively step by step to cause the shiftable section carried therein to be in matched relation successively with each one of the intermediate lower sections, and the particular operation for such movement of the carriage and the twisting of the spindles when in coincidence to perform the twisting function are identical with that just above described, and also the operation to place the carriage in such a position that the shiftable section therein will be in matched relation with either of the outside sections $f^2$ or $f^3$, which carry the cable-wires, and the operation of the various elements of the carriage which perform the twisting function to cause the continuous wire to be twisted with the respective intermediate strands is also the same so far as their movement is concerned; but in the operation of the said parts while the said shiftable section is in coincidence with the said outside sections $f^2$ or $f^3$ they run idle and perform no function whatever, as the sections $f^2 f^3$ are operated to perform the twist by a different mechanism. The particular manner of turning section $f^3$ is as follows: As previously noted in this specification, section $f^3$ derives its turning motion indirectly from the line-shaft $23^d$, as may be seen by reference to Figs. 1, 2, and 3, through the sprocket-wheel O, fixed directly upon said line-shaft and connected with sprocket-wheel $p$, running loose continually upon shaft $U^2$, said sprocket-wheel $p$ being designed to be engaged at the proper time by disk 130 through contact relation of the pin projections $P^2$, $P^2$, and $P^2$ thereon with arm 132 on said disk, which will cause shaft $U^2$ to be turned, which carries cog-wheel U, which meshes with cog-wheel V on the rear end of said section $f^3$, which will turn the same, the turning of the said section $f^3$ carrying with it in its movement spool-frames $d^2$ through connecting-bar E', the said engagement between sprocket-wheel $p$ and disk being made just at the time that the shiftable section of the carriage is in conjunction with section $f^3$, so that the continuous wire will be twisted with the cable-wires and just at the time when the mechanism of the carriage starts to perform its twisting function and also while the fabric is being drawn out the desired length of mesh, and such engagement continues during the whole interval while such said twist is being made and while the said fabric is being so drawn out, and such engagement between sprocket-wheel $p$ and disk 130 is immediately released at the moment such operation of twisting and drawing out has been performed. The engagement between sprocket-wheel $p$ and 130 is controlled from disk-wheel 91 through arm 134, carrying upon its upper extremity an antifriction-roller bearing upon the edge of said disk 91, as shown in Figs. 3, 5, and 17 and still other figures, the movement of the said disk being purposed to operate short arm 133, so as to contact with pin projection 132 on disk 130 in such manner as to cause the disengagement of said short lever 132 from one of the pins on sprocket-wheel P, as herein previously explained, such engagement and release being effected by the antifriction-roller on rod 134 being carried first upon the raised surface of disk 91 and then in the depressions therein alternately, the adjustment of the disk being such and its operation so timed as to effect such engagement and release exactly at the proper time to harmonize with the working of the various other elements of the machine. At the same time that section $f^3$ is being operated section $f^2$ is also being turned, both when the shiftable section of the carriage is in conjunction therewith and when it is in conjunction with section $f^3$, and at no other time, such operation of the two sections being simultaneous and continuing the same length of time and for the same purpose—namely, that of forming the cable. The particular mechanism by which this movement is effected may be seen by reference to Figs. 1, 2, and 16. As previously explained, said section $f^2$ derives its turning movement primarily and indirectly from the line-shaft $23^d$ through sprocket-wheel $m$, carried upon hollow shaft $m^2$, loose upon the line-shaft, said shaft having connected therewith clutch $m^3$, designed to engage clutch-wheel 127, said sprocket-wheel $m$ being connected with sprocket-wheel $n$ on the rear end of said section $f^2$ by means of a suitable sprocket-chain, said sprocket-wheel $m$ being timed to operate simultaneously with sprocket-wheel O on line-shaft, the proportions of the several sprocket-wheels, cog-wheels, &c., being such as to provide for the turning of sections $f^2$ and $f^3$ the same number of revolutions in a given time. The engagement of clutch $m^3$ with clutch-wheel 127 is controlled by disk 90 through pivoted arm 139, connected with hollow shaft $m^2$, as shown, the said arm being caused to be shifted in such manner as to alternately engage and release clutch-wheel 127 by means of an antifriction-roller carried upon one extremity thereof contacting with the surface of said disk wheel 90 and traveling alternately upon the raised portion thereof and then within the depressions, said disk 90 being set upon shaft 87 the same as disk 91, and bear such relation to each other that the rollers on reaches 139 and 134 will occupy relatively the same position with relation to the respective disks with which they contact with reference to their bearings upon the elevations and depressions thereof to provide for the simultaneous movement of said reaches to perform their respective functions, that the movements of the parts which they direct and control may be timed to harmonize with the working of the other elements of the device.

In connection with both of the above-described operations—that of turning respective sections $f^2$ and $f^3$—there are provided devices particularly useful in fastening the said sections and maintaining them in exactly the proper position while they are at rest, such position of section $f^3$ being maintained by the pawl 131 engaging notch in disk 130, that of section $f^2$ being controlled through dog 137 engaging pin projection from sprocket-wheel $n$, the same being operated from arm 139 through pivotal connection of arm 138 therewith, which said arm 138 is connected pivotally with arm 140, which connects pivotally with the short lever 150, which connects pivotally with the long reach 136, the adjustment of the said parts being such that as the arm 139 or the forward end thereof, bearing the antifriction-roller, is moved alternately in opposite directions the said dog 137 will be caused alternately to engage and release sprocket-wheel $n$ to engage the same when it is purposed that section $f^2$ shall be at rest and to release it as the said section is ready to be turned.

As previously explained in this specification, the rotating clamp adjusted in the forward part of the machine is purposed to draw out the fabric after it has been formed, and as will be seen from Fig. 12, in connection with the description already given, the fabric is designed to be drawn out after the carriage has traversed the entire width of the machine and after the several twists have been made to connect the continuous wire carried in the said carriage with the several strand-wires and cables and when the said carriage is at rest and the shiftable section therein is in coincidence with either of the outside sections $f^2 f^3$, and the machine is so constructed and the parts directing and controlling the drawing-out process are so proportioned that in their operation the fabric shall be drawn out a uniform distance with each turning of the clamp to provide a uniformity in the length of the meshes of the fabric. The various parts of the clamp are so proportioned that when the several elements thereof are in their proper position for this drawing-out process it is accomplished directly through the revolving of the clamp supported upon and turned with shaft $28^b$, which receives its motion indirectly from the line-shaft $23^d$ through sprocket-wheel 23, carried upon the hollow shaft $23^a$, which is loose upon said line-shaft $23^d$, which said hollow shaft is connected with friction-clutch $23^b$, designed to alternately engage and release clutch-wheel 24, secured on said line-shaft, which said sprocket-wheel is connected with sprocket-wheel 22 on shaft $24^a$ by means of sprocket-chain, which said shaft $22^a$ carries fixed thereon the beveled gear-wheel 21, in mesh with beveled gear-wheel 20, fixed upon shaft $21^a$, which shaft $21^a$ has also fixed thereon sprocket-wheel 19, turned therewith, said sprocket-wheel 19 being connected with sprocket-wheel 18 on shaft $18^a$ by means of suitable sprocket-chain, said sprocket-wheel 17 being connected with sprocket-wheel 16 on shaft $16^a$ by means of suitable sprocket-chain, which will turn shaft $16^a$, which turning of shaft $16^a$ will cause to be turned cog-wheel 15, fixed thereon, which meshes with cog-wheel 14 on shaft $28^b$, which supports the clamp. The sprocket-wheel 23, turning with the line-shaft, will through these several connections cause the said clamp to be turned, the parts being so arranged and connected that the roller will be turned from the front end of the machine and from the ends of the twister-sections in the bed-frame.

The particular manner of engagement of the strand-wires and cable-wires of the fabric by the clamp may be seen by reference to Fig. 12, in which it will be seen and as has been previously explained there are provided a number of parallelly-adjusted separate series of jaws, the said jaws of each particular series being set at intervals to correspond with the adjustment of the lower sections $f$, $f^2$, and $f^3$, there being provided one jaw in each particular series adjusted in front of each of said sections to engage the wires coming out therefrom, the diameter of the said clamp and the number of series of jaws being such that engagement by the jaws with the line-wires and cables will always be at points between the twists and at proper times, and such engagement to continue just so long as will best facilitate the operation of the machine. As will be seen from said Fig. 12 and as previously explained, the jaws are formed by the carrying of one of the parts thereof upon a shiftable bar carried in a suitable recess in the framework and designed to be moved back and forth, the stationary part of each respective jaw being connected with the framework of said clamp in such a manner as to span the recess in which the said sliding bar is carried and by means of the angle-bar 32 connected with said sliding bar, pivoted as at 35, and as the said angle-bar is also connected with short bar 33, which is connected with the framework, as at $35^a$, and as the said arm 32 carries the antifriction-roller 36 in contact relation with the stationary cam 37, as the said roller traverses the depressed portions of the said cam, the bar 26 will be caused to be shifted so as to cause the jaws to release the respective strands and cable-wires, and when the said roller traverses the gradual incline and finally travels upon the raised portion of said cam 27 said bar 26 will again be shifted so as to finally bring the respective parts of the jaws together to engage the said respective strands and cable wires, and in the plan of the machine the cam 37 is so adjusted, in connection with the revolving clamp, that the respective series of jaws as they are turned with the revolving of the clamp will be caused to engage the wires at the point of their maximum height in their revolution, which will be immediately in front of the respective sections in the bed-frame, the diameter of the said roller being upon the same plane as the cut faces of the respective forward half-journals of the sections of the said series and are designed to release the said wires at the point opposite in adjustment from said point of engagement, which is at the lower side of the roller. The turning of the said clamp, as previously explained, is designed to be intermittent and is controlled indirectly by disk 88 upon line-shaft 87 through the reach $88^a$, pivoted to the framework and connected at one end with the hollow shaft $23^a$ by means of fingers on the said reach bearing between collars on the said hollow shaft and an antifriction-roller carried upon the other extremity thereof bearing against the edge of said disk 88, the turning of the said disk causing the said antifriction-roller to traverse alternately the depressed and raised portion on the edge thereof to cause the friction-clutch $23^b$ on hollow shaft $23^a$ to be shifted so as to alternately engage and release clutch-wheel 24. As the antifriction-roller traverses the raised edge of the disk the friction-clutch $23^b$ will release clutch-wheel 24, and when clutch-wheel L is so released hollow shaft $23^a$ and the sprocket-wheel 23 thereon will be idle and the clamp will be at rest. As the antifriction-roller on arm $88^a$ traverses the depressed portions on the edge of the said disk the friction-clutch $23^b$ will be caused to engage clutch-wheel 24, which will turn hollow shaft $23^a$ therewith, and such movement derived from the line-shaft will be transmitted to the clamp, which will be revolved in the manner and for the purpose and the proper distances as hereinbefore described. The movement of the said clamp being so timed as to be rotated just at the time when the shiftable section in the carriage is in conjunction with either one of the cable-sections $f^2 f^3$ and just at the moment that the carriage is at rest and during the complete interval of such rest and at the same time that the said cable-sections are being turned, the adjustment of disk 88 upon shaft 87 being the same as that of disks 90 and 91, which control, respectively, indirectly the movements of sections $f^2$ and $f^3$, the movements of the said clamp will cease at the same instant of time that the said cable-twister sections are stopped and just at the time or immediately before the shiftable carriage is set in motion to bear toward the next adjacent twister-section.

As previously explained in this specification, the reel, which is provided for and designed to roll up the wire fabric as fast as it is drawn out by the clamp, derives its motion and power indirectly from the same source as the revolving clamp—that is, from the line-shaft $23^d$—such power and movement for each being transmitted through part of the same elements—that is, from the sprocket-wheel 23 on hollow shaft $23^a$, turned by clutch $23^b$ thereon, engaging with clutch-wheel 24, connected with sprocket-wheel 22 on shaft $22^a$ by suitable sprocket-chain—the turning of said shaft $22^a$ also turning beveled gear-wheel 21 thereon, which, meshing with beveled gear-wheel 20 on shaft $21^a$, causes said gear-wheel 20 and shaft $21^a$ to be turned, which also turns the face-plate 42 on shaft $21^a$, which is provided with the eccentrically-disposed pin $42^a$, with which reach 43 is pivotally connected. The said face-plate being so turned, a forward and backward movement is imparted to reach 43, upon which is carried supplemental reach 61, pivoted thereto at its forward end, as at 62, and with the rear end of said supplemental reach connected with reach 43 by special yielding device. The supplemental reach 61 is connected with the oscillating slotted arm 44, pivoted to the framework, as at 49, by means of the pin 51, provided with an expanded head, being carried in the slot in the said arm, the movement of the said oscillating arm 44 being transmitted to the friction clutch-wheel 40 by means of arms 45' 45'', the forward ends thereof pivoted at the same point to said bar 44 and the rear ends thereof pivoted to the upper extremities of radial arms $45^a 45^a$, said arms $45^a$ turning loose upon shaft $45^b$, the antifriction-rollers 48 $48^a$ being mounted upon the pivotal pin connecting said long arms 45' 45'' and $45^a 45^a$ in contact or bearing relation with wedges 46 $46^a$, which said wedges, as hereinbefore explained, are designed alternately to be impinged and released between the circumferential face of wheel 40 and the respective antifriction-rollers 48 $48^a$ with which they contact to alternately engage and release said wheel 40 with the backward and forward movement of the said arms 45' 45'', which, because of the adjustment of the said wedges 46 $46^a$ in connection therewith and their particular manner of support and operation, as hereinbefore particularly explained, will cause the said wheel 40 to be turned continuously in one direction, which will transmit a corresponding rotary motion to shaft $45^b$, upon which it is carried, which said shaft, running across and being journaled upon the framework of the machine, also carries fixed thereon the sprocket-wheel 41, which is connected with sprocket-wheel 39 upon shaft 12, upon which the reel-frame is mounted, upon which said frame the wire fabric is designed to be rolled, and during continuance of the movement and power directed from line-shaft through the various connecting elements therewith the said reel will be caused to be turned. As the wire is rolled upon the reel, starting from the first turn, the size of the roll will constantly be increased, so it is necessary that such movement of the reel shall be controlled so that it will turn to roll up the fabric just as fast as it is drawn out by the clamp. This is accomplished by means of the lever 52 being connected with sprocket-chain $57^a$, which supports the weight 59 upon one end and is connected through bar $56^c$ with roller 56, journaled in arm $56^a$, pivoted to the framework of the machine, as at $56^d$, said roller 56 being designed at all times to bear against the surface of the wire-fabric roll, and as the long lever 52 is pivoted to the framework, as at 54, and as the arm 53 is pivotally connected with the depending rod 53, as at $54^a$, and as depending reach 53 is connected directly with the expanded head of pin 51 on supplemental reach 61, as the size of the wire roll on the reel increases the roller 56 will be pushed downwardly, which will draw the sprocket-chain $57^a$ upwardly, so, as it will be seen, the pin 51 on the end of the supplemental reach 61 is carried at the highest point in the slot in the oscillating bar 44, which will be the adjustment when the wire is first connected with the reel, as the weight 59 will draw the roller up in contact with the body thereof. The reach 43 being operated when the pin 51 is in this adjustment, the oscillating arm 44 will be caused to be operated a considerable distance, as will be necessary when the fabric is being first rolled upon the reel; but as the size of the roll increases and the roller 56 is pushed downwardly the lever 52, by its engagement with sprocket-chain 57ª, as at 55, will be caused to be raised, or the rear end thereof, which will cause the forward end to be depressed, which will transmit, through the reach 53, a corresponding downward movement of pin 51, which will carry it gradually, as the size of the roll increases, farther down in the slot, which will result in a continued shortening of the oscillation of said bar 44, which will result, through connections therewith, in a corresponding shortening of the distance of revolution of the reel, this being continued until the roll of wire has been rolled to the size desired or until the pin 51 is depressed to the lowest point in the slot in bar 44, at which time further turning of the reel must cease. As previously stated, the reel through the various intermediate parts derives its motion and power from the same source as the clamp, the turning of the said reel being simultaneous with the revolution of the clamp and being purposed to take up the fabric as fast as it is drawn out by the clamp, and the fabric in being drawn from the clamp is carried over roller 37, as best shown in Fig. 2, which properly directs the said fabric in its movement backward. The movement of the said reel is timed and controlled by the same disk wheel 88 which times and controls the movements of the clamp, the connections and the direct manner of such control having been explained in connection with the description of the operation of the said clamp.

As previously explained in this specification, the shaft 87, upon which disks 88, 79, 89, 90, and 91 are fixedly carried, derives its power and motion indirectly from line-shaft 23ᵈ through sprocket-wheel 94, fixed upon said line-shaft and connected by sprocket-chain with sprocket-wheel 95, loose upon the auxiliary shaft 97, which said sprocket-wheel 95 is provided with lugs or pin projections 98 98 98, as shown in Figs. 18 and 18ª, and is designed to be alternately engaged and released through said pin projections by arm 101, pivotally connected with disk 99, fixed upon said auxiliary shaft 97, so that disk wheel 99 will alternately be turned and then be at rest, and when said disk is turned the antifriction-roller 100 thereon will be caused to contact with the radial arms 103, connected with and fixed upon shaft 87 for the purpose of turning the said shaft, such turning being facilitated by the engagement of notch 116 in the disk with the projections from octagon 115, the circumference of the said disk being designed to be carried in one of the respective curved sides of said octagon, such being the matched relation while the parts are at rest and also during the interval of the turning of the disk 99, except when roller 100 contacts with one of the arms 103, which causes one of the pins of the octagon to be carried in said notch 116 in the disk; but when the movement of shaft 87 ceases the circumferential edge of said disk is in matched relation with one of the curved sides of the said octagon, and, as previously explained in this specification, the movements of disk 99 are controlled through rack 104, pivoted for back-and-forward movement as at 118 and for side movement as at 117, the respective arms of the said rack carrying upon their extremities the antifriction-roller 105 to engage arm 101 on disk 99 and antifriction-roller 107 designed to alternately engage and release straps 110 on face-plate 112, the said face-plate 112, octagon 115, radial arms or bars 103, and straps 110 all being connected together and all fixed upon shaft 187 in the relative positions shown in the drawings. The particular and detailed operation of the relating parts to control the movements of disks 88, 79, 89, 90, and 91 on shaft 87, so that the movement of the disks will control movements of the various working parts of the machine to time and direct them to so work that their movements will harmonize with the complete operation of the machine, is as follows:

Assuming that the carriage has been in adjustment at the left-hand side of the machine with the shiftable section therein in coincidence with section $f^3$ and that in the operation of fixing the carriage in such position at the extreme left-hand side by the throwing upwardly of arm 8, as shown in Fig. 5, so that roller 76 would engage one of the circular recesses in bar 73, the supplemental arm 8ª will also be thrown upwardly and be caused to contact with depending part 8ᶜ on rack-bar 72 to cause the same to be thrown upwardly and be engaged by angle-bar 72ª through the pin projection 72ᵇ on said bar, which will have caused notched reach 108 to have been drawn forwardly, and that the carriage has started to move, and in its passage to the right-hand side of the machine, and in one of its stops to cause the matching relation of the shiftable section therein with one of the lower sections, and when being so stopped the arm 8 is thrown upwardly to fix the carriage in position, the roller 76 will be caused to contact with angle-bar 72ª, which will release bar 72 to permit the same to drop, and in the movement of the said bar the notched arm 108 will be thrown rearwardly to cause the said notched portion of bar 108 to engage with lug 104ª on rack-bar 104, at which time the said rack-bar 104 will be in the position shown in dotted lines in Fig. 18, in which said position antifriction-roller 105 will engage short arm 101 on disk 99, and the antifriction-roller 107 will bear against the outside curved edge of strap 110, the said rack 104 occupying this position when the disk 99 and the other parts which it is designed to operate and turn are at rest, and as the carriage continues its movement and arrives at the extreme right-hand side of the machine with the shiftable section therein in matched relation with section $f^2$, and the arm 8 is again thrown upwardly to fix the carriage in position, the supplemental arm $8^a$ will be caused to contact with depending part $8^b$ on rack-bar 72, which will throw the said rack-bar upwardly, and will again be engaged by angle-bar $72^a$ through pin projection $72^b$, and the said rack-bar 72 in being so thrown upwardly will cause the notched reach 108, because of the connection therewith, to be drawn forwardly, which will carry with it in such movement the rack-bar 104 a sufficient distance to cause the antifriction-roller 107 thereon to be relieved from the contact relation with the outside curved edge of strap 110, and when so relieved the action of spring 111 will throw the rack-bar forwardly and slightly sidewise into the position shown in solid lines in Fig. 18, in which position the antifriction-roller 107 will bear adjacent to the inside curved edge of strap 110 and against the face of disk 112, and the antifriction-roller 105 will be caused to be released from engagement with short arm 101 on disk 99, which will relieve the said short arm, allowing the same to spring upwardly to throw the lower portion thereof outwardly to engage one of the pins 98 on sprocket-wheel 95, which completes the connection with said wheel, and as the same is turned continually from the line-shaft through sprocket-chain connection with sprocket-wheel 94 on said line-shaft said disk will be turned, and the said disk is so proportioned with relation to the octagon 115 that one revolution of the said disk will cause the said octagon and the shaft 87, on which it is carried, to be turned one-eighth around, and it is further purposed that the said disk 99 shall be turned two revolutions in order that the said shaft 87 may be turned one-fourth around, at the conclusion of which said turning of disk 99 two revolutions, which has caused a one-fourth revolution of shaft 87, the strap 110 or the upper curved edge thereof will have been caused to contact with antifriction-roller 107 on rack 104 to force the said rack into position shown in dotted lines in Fig. 18, which will have caused antifriction-roller 105 to assume such a position that it will engage short arm 101 at the conclusion of the revolution of disk 99, the momentum of the said disk causing the said short arm 101 to be sufficiently depressed as to throw the lower portion thereof out of engagement with the pin or sprocket-wheel 95, which will allow the said sprocket-wheel to turn loose upon the line-shaft, while the disk 99 will be maintained in a stationary position by means of the notched disk 100G being engaged by a suitable pawl. The turning of the disk on shaft 87 to facilitate the directing of the several movements of the various working parts of the machine is also effected through notched bar 109, also designed to alternately engage and release lug $104^a$ on rack 104, the said notched bar 109 being operated indirectly from the movements of the clamp. In the operation of the clamp it is so proportioned and geared in this machine shown in the drawings that it turns one-fifth around every time it is operated, and in being so turned upon its supporting-shaft $28^b$ the disk $112^a$, carried thereon, will also be turned, and the pins $15^a$ thereon—there being five in number—are adjusted with relation to pivoted reach 113 so that at the time the clamp begins to revolve one of the pins will gradually force the rearward end of the said arm 113 forward, which will cause notched arm 109, acting through the connecting-levers, to be pushed gradually rearwardly until lug $104^a$ on rack 104 shall have been engaged by the notch in the said bar, and the pin on disk 112 pushes lever 113, or the lower end thereof, rearwardly to the maximum point, which the revolution of the said disk will enable it to do, and, as the pin recedes, the said lever 113, or the lower portion thereof, acting through spring 135, will be thrown forwardly, causing the notched bar 109 also to be borne forwardly, which will carry with it a short distance the rack 104, which will relieve the antifriction-roller 107 thereon from contact relation with the outer curved edge of strap 110, when the said rack will be thrown, through the action of spring 111, into the position shown in solid lines in Fig. 18, this operation being repeated as the succeeding pins on disk $112^a$ are caused to contact with the lower end of lever 132 for the purpose of releasing at the proper time the antifriction-roller 107 from contact relation with the outside curved edge of strap 110 to allow the rack to spring back into its normal position, which is that shown in solid lines in Fig. 18.

As previously stated, the disks 88, 79, 89, 90, and 91 on shaft 87 are designed to direct and control through suitable mechanism the operations of the various working parts of the machine. The particular manner of such control is as follows: The disks 88, 90, and 91 are so adjusted and the edges thereof so formed that the antifriction-rollers thereon upon reaches $88^b$, $139^a$, and $134^a$ will have such a bearing thereon as to operate the reaches $88^a$, 139, and 134, so that the respective parts with which they connect will alternately engage and release mechanism connected with said operative parts to cause the same to be set in motion and then stopped at the proper time, and as the outside sections $f^2 f^3$, the reel, and the clamp are all designed to operate and to be at rest at the same time and during the same interval of time the adjustments of the said disks 88, which control the movements of both the clamp and the reel, and disk 90, which directs and controls the movements of section $f^3$, are such that they will operate the respective reaches connected therewith exactly at the same time, and such simultaneous operation will always be to start or to stop the movements of the parts they are designed to control, so that all will start at the same instant of time and so that the operation of the clamp to draw out the wire fabric, the twisting of the cables, and the rolling up of the fabric will all be performed at one and the same time, these operations being performed at the time that the carriage is in adjustment either at the right or the left hand side of the machine, with the shiftable section therein in matched relation with one of the sections $f^2$ or $f^3$.

As previously stated, the movements of shaft 87 which control the movements of disks 88, 90, and 91 to direct and control the movements of the clamp, the reel, and the sections $f^2$ $f^3$ also control the movements of disks 79 and 89, which said disks in turn control and direct the movements and operation of the carriage, the form of said disks and said adjustment upon said shaft 87 being such that they will operate the antifriction-rollers $79^a$ and $89^a$, carried upon reaches 148 and $148^a$ in contact relation therewith, respectively, so that said reaches will be shifted in such manner that the movement of the carriage will be stopped just as the movement of the clamp, reel, and sections $f^2$ and $f^3$ are started and also will again be shifted so as to start the said carriage to move just at the conclusion of the operation of the said clamp, reel, and cable-sections $f^2$ $f^3$, the particular operation of the said disks being as follows: The carriage being in position, as previously stated, at the extreme right-hand side of the machine, with the shiftable section therein in matched relation with section $f^2$ and just at the time that the movements of the clamp, reel, and cable-sections $f^2$ $f^3$ are stopped, the antifriction-roller on reach $148^a$ will be caused to be dropped through the movements of shaft 87 into one of the depressions in disk 90, which will operate the reach connected therewith, so that clutch-wheel 127 will be engaged, which through connecting parts will cause the sprocket-chain B to be moved in such direction as to draw the carriage toward the left side of the machine, and as the carriage has traversed through its several successive steps the entire width of the machine and is in adjustment at the extreme left-hand side, with the shiftable section therein in matched relation with section $f^3$, and as the machine is fixed in such position by the pivoted arm 8, carried thereon, being thrown upwardly, so that the reel 76 is in the circular depression in the bar immediately above, the disk 90 will at that instant of time be turned so as to release the engagement that caused sprocket-chain B to move the carriage, and the same movement of shaft 87 to move disk 90 will move disks 88, 90, and 91 in such manner that the movements of the clamp, the reel, and the sections $f^2$ and $f^3$ will be started, and at the conclusion of the operation of these parts the movement of shaft 87 that stops them will cause disk-wheel 79 to be so turned as to actuate reach 148 to cause clutch-wheel 24 to be engaged, which will cause sprocket-chain B to run in the opposite direction from its former movement, which will cause the carriage to start and to travel toward the right side of the machine.

By reference to Fig. $9^a$ it will be seen that the forward end of the lower twister-section is formed with a depression therein, the said end being cut out around the perforation therein and depressed gradually to the lowest point of such depression, which is at the point just around the said perforation, said depression expanding gradually toward the cut face of the half-journal thereof, which depression is provided to allow the line-wires to be carried therein and therefrom, so as to direct it toward the horizontal plane through the cut face of the said section. It will also be seen in Fig. $8^a$ that the forward half-journal of the shiftable section is cut out in the same manner and for the same purpose as the lower section. Each of the respective lower sections of the series, including the outside sections, is so cut or depressed at the point indicated and shown.

The pivoted fingers (shown in Figs. 20 and $20^a$) are carried in a suitable framework attached to the forward face of the portion $A^5$ of the bed-frame and are suitably pivoted upon a bolt carried through the said frame part which supports said fingers, and there are provided suitable spiral springs intervening between the respective fingers and the sides of the supporting-frame, the respective ends of which said springs are connected with the fingers and the supporting frame part, and are so arranged that when the fingers are thrown outwardly and from the face of the bed-frame in the operation of the machine, as soon as the force which threw them outwardly is withdrawn, they will spring back to their original position, the particular location of these fingers being shown in Fig. 1 and referred to by letter $z$, and in the operation of the machine it is designed that as the fingers A, as shown in Fig. 15, are thrown outwardly they will contact with said fingers $z$, which will cause the same also to be thrown outwardly, the said fingers being purposed to brace the wires to facilitate in the twisting and to insure the perfect formation of the mesh.

Having thus fully described our invention, what we claim, and desire to secure by Letters Patent, is—

1. In a wire-fabric machine, the twisting-section $f$, formed with the half-journals having flat bearing-surfaces connected by the bowed intermediate part with the rear end of the section being fully round, and having a wire-delivery passage through a perforation in the rear half-journal, and through the forward half-journal thereof, the bowed portion of the section being grooved underneath to carry the wire therein, and the front end of the section recessed at and around the wire-delivery opening, all substantially as described and shown.

2. In a wire-fabric machine, the twister-section $f$, formed with the half-journals having cut bearing-surfaces in the same plane connected by the bowed intermediate portion and having the rear end thereof a full round, and provided fixedly thereon with the cog-wheel $y$, the said section having a perforation through the rear central body portion thereof, said perforation as it bears forwardly therein turning gradually downwardly, and opening out into a groove in the bowed portion, and having an eccentrically-disposed wire-delivery passage in the forward half-journal thereof, and with the forward face of the forward half-journal recessed around the wire-delivery passage, all substantially as described and shown.

3. In a wire-fabric machine, the twister-section $f^3$ formed with the half-journals having corresponding bearing-faces in the same plane connected by the bowed intermediate part, the said section being fully round at its rear end, and there being provided two centrally-disposed wire-delivery passages through the rear end of the said section, and grooved in the bowed portion, and two eccentrically-disposed wire-delivery passages in the forward half-journals thereof, with the forward end of the forward half-journal recessed, all substantially as described and shown.

4. In a wire-fabric machine, the combination with one or more sections $f$ provided with half-journals, the cut faces thereof in the same plane and connected by the bowed portion, and provided with a single perforation through the rear end of the said section, and the eccentrically-disposed wire-delivery passage in the forward half-journal of the section, with the twister-section $f^2$ having half-journals, the cut faces thereof being in the same plane and in the same plane as the cut faces of the half-journals $f$, the half-journals thereof connected by the bowed portion, and provided with two perforations through the rear end of the said section, and two eccentrically-disposed wire-delivery passages in the forward half-journal thereof to provide for the carrying of two wires through the rear end of the said section underneath the bowed portion and out through the eccentrically-disposed perforations in the front end of the said twister-section, all substantially as described and shown.

5. In a wire-fabric machine, the cable twister-sections $f^2$ and $f^3$, each being provided with two half-journals having flat bearing-faces in the same plane, the rear end of each respectively provided with two perforations, and the forward half-journals of each having two eccentrically-disposed wire-delivery passages, in combination with one or a series of sections $f$, each provided with half-journals the cut faces thereof in the same plane, and connected by the bowed part, each end thereof having a single perforation therein, and the forward half-journal being provided with an eccentrically-disposed wire-delivery passage, whereby two wires are carried from each of the sections $f^2$ and $f^3$, and a single wire carried through section or sections $f$, all substantially as described and shown.

6. In a wire-fabric machine, the combination with the shiftable section $k$, provided with the spool $g$, and having the half-journals the cut faces thereof in the same plane, and the forward journal provided with the eccentrically-disposed wire-delivery passage, of the cable-section $f^2$ having the half-journals the cut faces thereof in the same plane, and connected with the bowed part, and provided with two perforations in the rear end thereof, and two eccentrically-disposed wire-delivery passages in the front end thereof, all substantially as described and shown.

7. In a wire-fabric machine, the shiftable section $k$, formed of the divided spool carrying a frame supporting the spool $g$ therein, and terminating at its forward and rear ends with the half-journals provided with full bearing-faces in the same plane, and with the forward half-journals thereof provided with the eccentrically-disposed wire-delivery passage, and with the forward end of the forward half-journal cut out or depressed, all substantially as described and shown.

8. In a wire-fabric machine, a series of twister-sections for carrying line-wires, the two outside sections adapted to carry and deliver two wires, and respective intermediate sections adapted to carry and deliver one wire, a shifting section or sections carrying crossing wire or wires to impinge upon the former while they aline therewith, and be rotated therewith, all substantially as described and shown.

9. In a wire-fabric machine, a series of twister-sections, the outside sections of the series adapted to receive and deliver eccentrically two wires each, and the respective intermediate sections adapted to receive and deliver eccentrically one wire, and a shifting section carrying a spool, and adapted to deliver eccentrically a single strand for crossing wire, adapted to impinge upon the former in succession while they aline therewith and be rotated therewith, all substantially as described and shown.

10. In a wire-fabric machine, a spindle formed of two sections, one section adapted to receive and deliver eccentrically two strands, and the other section carrying a spool, and adapted to deliver eccentrically a single strand, and means for rotating the said spindle, when the sections are in conjunction, all substantially as described and shown.

11. In a wire-fabric machine, a spindle formed of two sections, each having matching half-journals, one section having a deflected central body portion, and provided with double perforations with depressions around the delivery-openings therein, adapting it to receive and deliver two strands of wire, the other section carrying a spool, and perforated through its half-journal and depressed around the perforations at the delivery-point, adapting it to carry and deliver a single strand of wire, all substantially as described and shown.

12. In a wire-fabric machine, the series of twister-sections $f$, $f^2$ and $f^3$, each having half-journals, and formed with the central body portion thereof deflected to give it a bowed form, each intermediate section $f$ perforated to adapt it to carry and deliver a single strand of wire, and the outside sections $f^2$ and $f^3$ provided with double perforations, adapting them to receive and deliver two strands of wire each of the said sections being recessed or depressed around the perforations at the delivery-points, all substantially as described and shown.

13. In a wire-fabric machine, the combination with the twister-sections, $f$, $f^2$ and $f^3$, each having half-journals, and formed with the central body portion thereof deflected to give it a bowed form, each intermediate section $f$ perforated to adapt it to carry and deliver a single strand of wire, and the outside sections $f^2$ and $f^3$ provided with double perforations, adapting them to receive and deliver two strands of wire, of a shiftable section or sections provided with half-journals and carrying a spool or spools provided with a suitable perforation in the half-journal thereof, adapting said shiftable section to carry and deliver a single strand of wire each of the said sections being recessed or depressed around the perforations at the delivery-points, all substantially as described and shown.

14. In a wire-fabric machine, the series of twister-sections $f$, $f^2$ and $f^3$, the two outside sections $f^2$ and $f^3$ provided with double perforations adapting them to receive and deliver two strands of wire, and the respective intermediate sections provided with single perforations, adapting them to receive and deliver one strand of wire, the shifting section carrying a spool provided with a single perforation, adapting them to receive and deliver one strand of wire each of the said sections being recessed or depressed around the perforations at the delivery-points, and suitable mechanism for shifting the said shifting section from one section to another to provide for the matching thereof, and suitable mechanism for rotating the said spindles while in such matched relation, all substantially as described and shown.

15. In a wire-fabric machine, a series of twister-sections $f$, $f^2$, and $f^3$, the respective outside sections of the series being each provided with two half-journals having flat bearing-faces in the same plane, with the rear ends thereof being fully round, and each section, or the rear portion thereof, respectively, provided with two perforations, and the bowed portion provided with grooves, and the forward half-journals of each having two eccentrically-disposed wire-delivery passages, and the forward end of each of the forward half-journals of the respective outside sections $f^2$ and $f^3$ being cut out around the perforations at the delivery-points, and each of the respective intermediate sections being formed with two half-journals, having smooth bearing-faces, respectively, in the same plane, and connected by the bowed intermediate part, and with the rear portions thereof made fully round, and each respective section bearing a cog-wheel as $y$, and each of the said intermediate sections or the rear portion thereof being provided with an eccentrically-disposed perforation, and each of the respective intermediate sections having the bowed portion thereof grooved, and each of the respective sections having the forward half-journal thereof provided with an eccentrically-disposed wire-delivery passage, and each of the forward half-journals of the respective intermediate sections having the forward end thereof recessed, all substantially as described and shown.

16. In a wire-fabric machine, the spindle formed of section $k$ supporting the spool $g$, and provided with front and rear half-journals, the forward half-journals provided with an eccentrically-disposed wire-delivery passage and a depression or recess at the delivery end of said passage, and the lower section $f$, formed with two half-journal bearings with which the half-journals of section $k$ are matched, connected by the bowed intermediate portion, and being made fully round at its rear extremity, and provided with a wire-delivery passage through the central part of the rear end, and a groove underneath the bowed portion, and the eccentrically-disposed wire-delivery passage in the forward half-journal thereof, recessed or depressed around the delivery-point and suitable mechanism for turning the said spindle when the parts are in such matched relation, all substantially as described and shown.

17. In a wire-fabric machine, the spindle formed of section $k$ supporting the spool $g$, and provided with front and rear half-journals, the forward half-journal provided with an eccentrically-disposed wire-delivery passage, the lower section $f$ formed with two half-journals, with which the half-journals of section $k$ are matched, connected by the bowed intermediate portion, and being made fully round at its rear extremity, and provided with a wire-delivery passage through the central part of the rear end, and grooved underneath the bowed portion, and having the eccentrically-disposed wire-delivery passage in the forward half-journal, the forward end of the said forward half-journal being recessed as shown, and there being provided upon the rear end of said section the cog-wheel $y$, all substantially as described and shown.

18. In a wire-fabric machine, the combination with sections $f$, $f^2$ and $f^3$ suitably supported in the framework of the machine, each of said sections being provided with half-journals, and having the central body portion thereof deflected, and the sections $f^2$ and $f^3$ each provided with double perforations for carrying and delivering two strands of wire, and each intermediate section $f^2$ provided with a single perforation adapting it to receive and deliver a single strand of wire, of shiftable sections, each carrying a spool, and provided with a delivery-passage adapting it to carry and deliver a single strand of wire, each of the sections $f$, $f^2$, $f^3$, and the shiftable sections being recessed around the perforations in each at the delivery-points, and a suitable shiftable framework for supporting the said shifting sections, and suitable mechanism for turning the spindles formed by the matching sections, all substantially as described and shown.

19. In a wire-fabric machine, the combination with the sections $f$, $f^2$ and $f^3$ suitably supported in the framework of the machine, each of the said sections being provided with half-journals and deflected at the central body portion thereof, the sections $f^2$ and $f^3$ each provided with double perforations for carrying and delivering two strands of wire, and each intermediate section $f$ provided with a single perforation adapting it to receive and deliver a single strand of wire, of a shiftable section carrying a spool, and provided with suitable half-journals adapting it for matching relation with the sections $f$, $f^2$ and $f^3$, and provided with a single perforation in one of its half-journals adapting it to deliver a single strand of wire, each of the sections $f$, $f^2$, $f^3$, and the shiftable section being recessed around the perforation in each at the delivery-points, and a shiftable framework or carriage for supporting the said shiftable section, and mechanism for moving the said carriage to shift the said section to cause the same to match with the sections $f$, $f^2$ and $f^3$, and suitable mechanism for turning the said combined sections when in such matched relation, all substantially as described and shown.

20. In a wire-fabric machine, a series of laterally-stationary web-wire carriers, a shiftable carriage in combination therewith carrying the weft-wire carrier provided with the detachable shoe 11, in which the weft-wire carrier is journaled, all substantially as described and shown.

21. In a wire-fabric machine, the combination with the web-wire carriers $f$, $f^2$, $f^3$, and with the shiftable carriage $B^2$, of the weft-wire carrier $k$, journaled and detachably supported in shoe 11, all substantially as described and shown.

22. In a wire-fabric machine, provided with web-wire carriers and an adjustable carriage carrying a weft-wire carrier, the combination with the said carriage and the spindles formed by the matching successively of the weft-wire carrier with each of the web-wire carriers, of the means for turning the spindles consisting of the cog-wheels $y$, on each of the web-wire carriers, the cog-wheel X, on shaft $X^5$, hollow shaft $U^2$, on line-shaft $II^2$, the clutch-wheel $U^1$, on hollow shaft $U^2$, the clutch-wheel L, on line-shaft $II^2$, and suitable sprocket-wheel and sprocket-chain connection between hollow shaft $U^2$, and shaft $X^5$, all substantially as described and shown.

23. In a wire-fabric machine, provided with web-wire carriers and an adjustable carriage carrying a weft-wire carrier, the combination with the said carriage and the spindles formed by the matching successively of the weft-wire carrier with each of the web-wire carriers, of the means for turning the spindles consisting of the cog-wheels $y$, on each of the web-wire carriers, the cog-wheel X, on shaft $X^5$, hollow shaft $U^2$, on line-shaft $II^2$, the clutch-wheel $U^1$, on hollow shaft $U^2$, the clutch-wheel L, on line-shaft $II^2$, and suitable wheel and sprocket-chain connection between hollow shaft $U^2$, and shaft $X^5$, suitable mechanism for turning line-shaft $II^2$, and mechanism for shifting hollow shaft $U^2$, to cause friction-wheel $U^4$, to alternately engage and release clutch-wheel L, all substantially as described and shown.

24. In a wire-fabric machine, a shiftable carriage having a bearing and transverse sliding relation with the bed-frame in which the twister-sections $f$, $f^2$ and $f^3$ are carried, carrying the shiftable section $k$, therein in detachable relation therewith, and in such adjustment that the flat faces of the respective half-journals of the said shiftable section aline with the bearing edges of the frame parts thereof when said shiftable section is in its normal position, and mechanism for shifting the carriage, consisting of the hollow shaft $J^2$ carried loose on the line-shaft $II^2$, and having fixed thereon cog-wheel J, in mesh with the run of cogs K, and friction-clutch $J^4$ fixed upon said hollow shaft designed for alternate impingement and release of clutch-wheel L, fixed on line-shaft $II^2$, and suitable mechanism for actuating said clutch $J^4$ for alternate engagement and release of clutch-wheel L, whereby when clutch-wheel L is engaged by friction-clutch $J^4$ on shaft $II^2$, which said shaft is designed to run continuously but alternately in opposite directions through suitable mechanism provided connected with the power, that the hollow shaft $J^2$ will be turned and with it the cog-wheel J thereon, which said cog-wheel meshing with the run of cogs K will cause the carriage to be moved in the opposite direction from which said cog-wheel J is turned, all substantially as described and shown.

25. In a wire-fabric machine, provided with web-wire carriers, the combination therewith of a shiftable carriage carrying a weft-wire carrier, and the means for shifting the carriage consisting of the hollow shaft $J^2$, supported on line-shaft $II^2$, the cog-wheel J, the cog-rack K, friction-clutch $J^4$, fixed on said hollow shaft, clutch-wheel L, on line-shaft $II^2$, suitable power applied to turn shaft $II^2$, and suitable mechanism for causing clutch $J^4$ to alternately engage and release clutch-wheel L, all substantially as described and shown.

26. In a wire-fabric machine, the combination with a shiftable carriage thereof having a bearing and transverse-sliding relation with the bed-frame in which the twister-sections $f$, $f^2$ and $f^3$ are carried carrying the shiftable section $k$ therein, of the line-shaft $H^2$ the hollow shaft $J^2$ carried loose thereon, and provided with cog-wheel J and friction-clutch $J^4$, the run of cogs K, and the clutch-wheel L fixed on line-shaft $H^2$; and the mechanism for shifting clutch $J^4$ consisting of the reach $6^a$ connected with the hollow shaft $J^2$, shift-rods 1 and 2 suitably connected, shift-rod 1 being provided with antifriction-roller $m^2$ in bearing relation with a suitable cam-wheel, whereby when said cam-wheel is turned, movement will be transmitted through the several connecting parts with friction-clutch $J^4$ to cause the same to impinge and release clutch-wheel L, all substantially as described and shown.

27. In a wire-fabric machine, a shiftable carriage having a bearing and transverse-sliding relation with the bed-frame in which the twister-sections $f$, $f^2$ and $f^3$ are carried carrying the shiftable section $k$ therein, and mechanism for shifting the carriage consisting of the line-shaft $H^2$, the hollow shaft $J^2$ carried loose thereon and provided with cog-wheel J, and friction-clutch $J^4$, the run of cogs K, and the clutch-wheel L fixed on line-shaft $H^2$, and the mechanism for shifting clutch $J^4$ consisting of the reach $6^a$ connected with the hollow shaft $J^2$, shift-rods 1 and 2 suitably connected, shift-rod 1 being provided with antifriction-roller $m^2$ in bearing relation with a suitable cam-wheel, whereby when said cam-wheel is turned movement is imparted through the several connecting parts with friction-clutch $J^4$ to cause the same to alternately impinge and release clutch-wheel L, all substantially as described and shown.

28. In a wire-fabric machine, the combination with a shiftable carriage having a bearing and transverse-sliding relation with the bed-frame in which the twister-sections $f$, $f^2$ and $f^3$ are carried, carrying the shiftable section $k$ therein, of the mechanism for shifting the carriage consisting of the line-shaft $H^2$, the hollow shaft $J^2$ carried loose thereon, and provided with cog-wheel J and friction-clutch $J^4$, the run of cogs K, and the clutch-wheel L fixed on line-shaft $H^2$; and the mechanism for shifting the clutch $J^4$, consisting of the reach $6^a$ connected with the hollow shaft $J^2$, shift-rods 1 and 2 suitably connected shift-rod 1 being provided with antifriction-roller $m^2$ in bearing relation with a suitable cam-wheel; and the mechanism for moving antifriction-roller $m^2$ back and forth, alternately, consisting of cam M on shaft N, the pentagon 66 provided with pin 67, the bar 68 having notches 69, the pin 70 the concave-sided pentagon R, and fingers $S^3$ on shaft P, partially-cogged wheel T on shaft P, and partially-cogged wheel $X^2$ on shaft $X^5$, all substantially as described and shown.

29. In a wire-fabric machine, a shiftable carriage having a bearing and transverse-sliding relation with the bed-frame in which the twister-sections $f$, $f^2$ and $f^3$ are carried carrying the shiftable section $k$ therein, and mechanism for shifting the carriage consisting of the line-shaft $H^2$, the hollow shaft $J^2$ carried loose thereon, and provided with cog-wheel J and friction-clutch $J^4$, the run of cogs K and the clutch-wheel L, fixed on line-shaft $H^2$; and the mechanism for shifting clutch $J^4$ consisting of the reach $6^a$ connected with the hollow shaft $J^2$, shift-rods 1 and 2 suitably connected, shift-rod 1 being provided with antifriction-roller $m^2$ in bearing relation with a suitable cam-wheel, and the mechanism for moving antifriction-roller $m^2$ back and forth, alternately consisting of cam M, on shaft N, pentagon 66 provided with pin 67, the bar 68 having notches 69, the pin 70, the concave-sided pentagon R, and fingers $S^3$ on shaft P, partially-cogged wheel T on shaft P, and partially-cogged wheel $X^2$ on shaft $X^5$, all substantially as described and shown.

30. In a wire-fabric machine, a shiftable carriage having a bearing and transverse-sliding relation with the bed-frame in which the twister-sections, $f$, $f^2$ and $f^3$ are carried carrying the shiftable section $k$ therein in detachable relation therewith, suitable mechanism for actuating the said carriage to cause the same to be moved step by step from one side of the machine to the other alternately and suitable mechanism for stopping the carriage at the intermediate points in such passage to provide for the successive matching relation of the shiftable section $k$ carried therein, with each of the lower twister-sections carried in the bed-frame upon which the carriage travels, and suitable mechanism for rotating the spindle when the shiftable section $k$ is in matching relation successively with each section of the series, all substantially as described and shown.

31. In a wire-fabric machine, the combination with the shiftable carriage thereof having a bearing and transverse-sliding relation with the bed-frame in which the twister-sections $f$, $f^2$ and $f^3$ are carried carrying the shiftable section $k$ detachably therein, of the mechanism for alternately stopping and moving the said carriage, and suitable mechanism for turning the spindle formed by the matching relation of the shiftable section $k$ in the carriage, and with each one of the sections $f$, successively, all substantially as described and shown.

32. In a wire-fabric machine, the combination with the shiftable carriage thereof having a bearing and transverse-sliding relation with the bed-frame in which the twister-sections $f$, $f^2$ and $f^3$ are carried carrying the shiftable section $k$ therein, of the mechanism for turning the spindles formed by the matching relation of the shiftable section $k$ with each one of the intermediate sections $f$, consisting of the line-shaft $H^2$, the hollow shaft $U^2$ on line-shaft $H^2$ and having fixed thereon the friction-clutch $U^4$ and the sprocket-wheel $X^3$ the sprocket-wheel $U^5$ on shaft $X^5$ connected with the sprocket-wheel $X^3$ by suitable sprocket-chain, and partially-cogged wheel X which meshes successively with partially-cogged wheel $y$ on section $f$, all substantially as described and shown.

33. In a wire-fabric machine, the combination with the shiftable carriage thereof having a bearing and transverse-sliding relation with the bed-frame in which the twister-sections $f$, $f^2$ and $f^3$ are carried, carrying the shiftable section $k$ therein, of the mechanism for turning the spindle formed by the matching relation of the shiftable section $k$ with each one of the intermediate sections $f$, consisting of a clutch-wheel mounted in the carriage adapted to be continuously revolved, a clutch mechanism adapted to alternately engage and release said wheel and to be actuated thereby to operate intermediate mechanism between the clutch-wheel and the twister-spindle, all substantially as described and shown.

34. In a wire-fabric machine, the combination with the shiftable carriage thereof having a bearing and transverse-sliding relation with the bed-frame in which the twister-sections $f$, $f^2$, $f^3$, are carried, carrying the shiftable section $k$, therein, of the mechanism for turning the spindles formed by the matching relation of the shiftable section $k$, with each one of the intermediate sections $f$, consisting of a clutch-wheel mounted in the carriage adapted to be continuously revolved, a clutch mechanism adapted to alternately engage and release said wheel and to be actuated thereby to operate intermediate mechanism between the clutch-wheel and the twister-spindle, and suitable mechanism for moving the carriage alternately back and forth across the bed-frame, all substantially as described and shown.

35. In a wire-fabric machine, the combination with a shiftable carriage thereof having a bearing and transverse-sliding relation with a suitable bed-frame therein provided, of the mechanism for causing the carriage to be moved back and forth upon the bed-frame, and for controlling the intermittent or step-by-step movement thereof in such passage, consisting of the disk-wheel 89 carried upon shaft 87, the reach $148^a$ suitably pivoted between its extremities and provided with antifriction-roller $89^a$ upon one end thereof, the other end being connected with hollow shaft $25^a$ on line-shaft $23^d$, the hollow shaft $25^a$ provided with suitable friction-clutch, the friction-clutch wheel 127 upon line-shaft $23^d$ and suitable sprocket-wheel and sprocket-chain connection with the line-shaft $H^2$ of the carriage, all substantially as described and shown.

36. In a wire-fabric machine, the combination with the shiftable carriage of the pivoted bar 8 provided with the antifriction-roller 76 designed to be raised and depressed alternately, so that when raised the antifriction-roller 76 will be carried in one of the circular depressions 75 in bar 73 upon the framework of the machine, and suitable mechanism for actuating the said pivoted bar 8 upwardly at the proper time consisting of ellipsis 7 fixed upon shaft P in the carriage, and provided with the eccentrically-disposed pin bearing the antifriction-roller $7^a$, all substantially as described and shown.

37. In a wire-fabric machine, the combination with the respective outside twister-sections $f^2$ and $f^3$, of the spool-carrying frame $d$, $d^2$ suitably journaled for rotation and connected therewith respectively by reaches E, E', and suitable mechanism for turning the said combined parts, section $f^2$ and spool-carrying frame $d$, and section $f^3$, and spool-carrying frame $d^2$ simultaneously, all substantially as described and shown.

38. In a wire-fabric machine, the combination of twister-section $f^3$ and spool-carrying frame $d$ suitably connected with said section $f^3$, of the mechanism for imparting to and controlling the intermittent movements thereof, consisting of disk-wheel 91 upon shaft 87, the reach 134, one end thereof having a suitable bearing relation with said disk-wheel 91, and provided with a suitable projection from its lower extremity, the sprocket-wheel P loose upon shaft $u^6$, and provided with pin projections from one side thereof, the disk 130 on shaft $u^6$ provided with pivoted arm 132, and suitable shaft and cog-wheel connections with section $f^3$, and suitable sprocket-wheel and sprocket-chain connection between sprocket-wheel $p$ and line-shaft $23^d$, all substantially as described and shown.

39. In a wire-fabric machine, the combination with the twister-section $f^2$ and spool-carrying frame $d$, connected therewith of the mechanism for turning the said section and spool-carrying frame, and for controlling the intermittent movement thereof consisting of disk-wheel 90 on shaft 87, the reach 139 suitably pivoted between its extremities with one end thereof having a bearing relation with said disk-wheel 90, the other end having loose connection with the hollow shaft $m^5$, provided with friction-clutch $m^3$, the clutch-wheel 127 on shaft 123, and suitable sprocket-wheel and sprocket-chain connection between hollow shaft $m^5$ and section $f^3$, all substantially as described and shown.

40. In a wire-fabric machine the combination, with a revoluble cylinder or frame, of mechanism for turning said cylinder or frame, consisting of a surface or peripherally engaged wheel, suitably connected with said cylinder, two clutches suitably supported in close proximity to the surface of said wheel, two reaches, their forward ends suitably connected, one with each of said clutches and pivoted together at their rear extremities, an part and connected with the reel-cylinder or frame from the said pin through suitable intermediate parts, a driving-reach, one end thereof connected with said oscillating bar and vertically adjustable within the slot in said bar, and suitable mechanism connecting the adjustable end of said reach with the surface of the fabric on the reel-cylinder or frame.

51. In a wire-fabric machine the combination with a reel-cylinder or frame of an oscillating bar connected with said reel-cylinder or frame by suitable intermediate parts, a driving-reach one end thereof connected with said oscillating bar and vertically adjustable thereon, and suitable mechanism connecting the adjustable end of said driving-reach with the surface of the fabric being rolled upon the reel-cylinder.

52. In a wire-fabric machine, the revolving reel I, journaled in the framework of the machine, and suitable mechanism for imparting rotary movement thereto, and for controlling and graduating the turning thereof so that it will roll up the wire fabric thereon just as fast as it is drawn out by the revolving clamp, all substantially as described and shown.

53. In a wire-fabric machine, the combination with the revolving clamp of the reel I, connected therewith by the wire fabric being woven, and suitable mechanism for imparting rotary movement thereto, and suitable mechanism for controlling such movement to graduate the turning thereof so as to roll up the fabric just as fast as it is drawn out by the clamp, all substantially as described and shown.

54. In a wire-fabric machine, the combination with the framework thereof, of the reel I, detachably journaled in connection therewith, the mechanism for imparting rotary movement thereto, consisting of clutch-wheel 40, actuated by suitable mechanism connected with the power, and connected with the reel by means of suitable sprocket-wheels and sprocket-chain, all substantially as described and shown.

55. In a wire-fabric machine, the combination with the framework thereof of reel I, and the mechanism for turning said reel consisting of clutch-wheel 40, suitably connected by shaft, sprocket-wheels and sprocket-chains with said reel, the pivoted arms 45$^a$, 45$^a$, loose upon shaft 45$^b$ upon which clutch-wheel 40 is fixed, the long arms 45, 45 pivoted to upper extremities of short arms 45$^a$, 45$^a$, the antifriction-rollers 48, 48$^a$ journaled upon the pivoted arm connecting bars 45 and 45$^a$, the wedges 46, 46$^a$, suitably supported to bear between antifriction-rollers 48, 48$^a$, and the circumferential faces of clutch-wheel 40, and provided with suitable spring tension to draw or force them into impinging relation between the respective antifriction-rollers 48, 48$^a$ and the circumferential face of clutch-wheel 40, the oscillating slotted bar 44 with which arms 45 are pivotally connected at the same point, the reach 43, having connected therewith the supplemental reach 61, which bears pin 51, carried within the slot in oscillating bar 44, and suitable mechanism for actuating said reach 43 back and forth, all substantially as described and shown.

56. In a wire-fabric machine, the combination with the reel I, and the mechanism for turning the said reel consisting of clutch-wheel 40, suitably connected with reel I, the oscillating slotted bar 44, suitably connected with the bar to cause the same to be moved back and forth, and connected with clutch-wheel 40, through the arms 45, 45, and 45$^a$, 45$^a$, and suitable wedges, of the mechanism for graduating the turning of reel I, consisting of reel 56, suitably connected with the framework of the machine, suitable mechanism connected with the roller to maintain the same constantly in bearing relation with the fabric on the reel as weight 59, connected therewith by sprocket-chain and bar and pivoted lever 52, and depending reach 53, connected with pin 51, all substantially as described and shown.

57. In a wire-fabric machine, the combination therewith of a revoluble reel actuated through suitable connection therewith by a surface-driven wheel, all substantially as described and shown.

58. In a wire-fabric machine, the combination with suitable wire-delivery spools, and with suitable spindles, and with suitable mechanism for weaving a fabric, of a revoluble reel for receiving a fabric after being woven, actuated through suitable connection therewith by surface-driven wheel, and suitable mechanism for actuating the said wheel, whereby the reel will be revolved to roll up the fabric, all substantially as described and shown.

59. In a wire-fabric machine, the combination with a reel-cylinder or frame of a surface-driven wheel connected therewith by suitable means, and suitable mechanism for turning the said surface-driven wheel, all substantially as described and shown.

60. In a wire-fabric machine, the combination therewith of a revoluble reel-cylinder, and the mechanism for turning the said reel-cylinder, consisting of a surface or peripherally driven wheel connected therewith, a suitable alternately-engaging surface-bearing clutch suitably actuated for alternate engagement and release of the surface of the said wheel, all substantially as described and shown.

61. In a wire-fabric machine, the combination with suitable mechanism for weaving a fabric, of a reel-cylinder for rolling up the fabric as it is made, and mechanism for turning the said reel-cylinder consisting of a surface or peripherally driven wheel connected therewith, and suitable alternately-engaging surface-bearing clutches, suitably actuated for such alternate engagement and release of the surface of the wheel, all substantially as described and shown.

oscillating bar bearing a pivoting-pin for said reaches, and suitable driving mechanism, adjustably connected with the said oscillating bar, for causing the said bar to be so actuated, all substantially as described and shown.

41. In a wire-fabric machine the combination, with a revoluble cylinder or frame, of the mechanism for turning the said cylinder or frame, consisting of a peripherally or surface driven clutch-wheel, two substantially wedge-shaped, surface-impinging clutch-blocks, suitably carried on opposite sides of said wheel in close proximity to the surface thereof, two driving-arms, the forward ends thereof, suitably connected with the clutches or with the clutch-supports, and having their rear ends pivoted together, an oscillating bar bearing a pin upon which the said reaches are pivoted and slotted below the said pivoting-pin, and suitable mechanism for actuating the said oscillating bar, having an adjustable relation or connection with the slotted portion of the said bar.

42. In a wire-fabric machine the combination with a revoluble cylinder or frame of mechanism for turning the said cylinder or frame consisting of two friction-clutch blocks, actuated from an oscillating bar, through clutch-driving arms, connected with said clutch-blocks, and pivoted together at their rear extremities, upon a pin on the oscillating bar, suitable mechanism for connecting the said oscillating bar with the power to provide an adjustable relation between the connecting element and said oscillating bar, at points below the said pivoting-pin and suitable levers or reaches connecting the adjustable driving mechanism, carried in connection with said oscillating bar, with the surface of the fabric-roll, whereby, as the parts are operated, the reel will be turned and as the fabric is rolled up gradually increasing the size of the roll, the parts of the driving mechanism will be adjusted automatically to graduate the turning of the reel-cylinder to roll up the fabric as fast as it is delivered from the machine.

43. In a wire-fabric machine the combination, with a wrapping-cylinder or frame thereof, and with a mechanism for turning said reel-cylinder or frame, consisting of an oscillating member, suitably connected by intermediate parts with the reel-cylinder and with a driving-reach for actuating said oscillating member forwardly and rearwardly and vertically adjustable thereon, of mechanism for graduating the turning of the fabric-cylinder or frame by suitable connection of said driving-arm with the surface of the fabric-roll on the reel-cylinder or frame.

44. In a wire-fabric machine the combination with the wheel 40 thereof, suitably connected with the reel-cylinder or frame, of the mechanism for turning the said wheel 40, intermittently, in one continuous direction, consisting of the impinging blocks, 46, 46ª, substantially wedge-shaped, supporting radial arms, 45ª, 45ª, for said blocks, the driving-arms 45, 45 pivoted each at one extremity of the radial arms 45ª, 45ª, and pivoted together at their rear extremities, the oscillating slotted bar 44, carrying pivoting-pin 50, for said arms 45, 45 and mechanism for actuating the several parts by suitable connection with said oscillating bar, all substantially as described and shown.

45. In a wire-fabric machine, the combination with the reel-cylinder or shaft A, thereof, of the oscillating bar, slotted in the lower portion thereof and connected with the reel-cylinder, from a pin in said bar located above the slotted portion thereof by suitable intermediate driving parts, the reach 5, connected eccentrically at one end with a part driven from the power applied, the other end thereof provided with pin 6, adjustable vertically within the slot in the oscillating bar and suitable mechanism connecting pin 6, with the surface of the fabric being rolled upon the reel or cylinder.

46. In a wire-fabric machine, the combination with a reel-cylinder or frame, of an oscillating bar connected therewith by suitable intermediate parts, a suitable reach, connected at one end with a driving power and the other end thereof vertically shiftable with relation to the oscillating bar and suitable mechanism connecting the vertically-adjustable free end of said reach, with the surface of the fabric upon the reel-cylinder.

47. In a wire-fabric machine, the combination with the clutch-wheel 40, of the clutch-blocks 46 and 46ª one on each side of the wheel mounted upon a yielding support, and means for supporting and operating said clutch-blocks back and forth simultaneously to engage the wheel, first with one block and then with the other, substantially as described and shown.

48. In a wire-fabric machine, the combination with wheel 40, of the friction-blocks 46 and 46ª mounted upon a yielding support, the short arms 45ª, 45ª, and the long arms 45, 45 pivoted together and antifriction-rollers 48, 48ª, and means for operating long and short arms 45, 45 and 45ª, 45ª back and forth, substantially as described and shown.

49. In a wire-fabric machine, consisting of a revoluble frame and oscillating bar connected with said frame through suitable clutches, a clutch-wheel and clutch-driving arms, and connected with the power through a suitable reach, one end thereof adjustable therewith, said oscillating bar and mechanism for connecting the adjustable end of said reach with the surface of the fabric-roll on the said frame, to cause the said reach to be adjusted upon the oscillating bar so that as the size of the fabric-roll increases, the length of the stroke of the oscillating bar will be decreased.

50. In a wire-fabric machine, the combination, with a reel-cylinder or frame of an oscillating bar, slotted in its lower portion and bearing a pin at a point above the said slotted 62. In a wire-fabric machine, the combination with suitable spindles for weaving a fabric, and with a suitable clamp for drawing out the fabric as fast as it is woven, of a revoluble reel-cylinder for rolling up the fabric and mechanism for turning the said cylinder consisting of a surface or peripherally driven wheel suitably connected therewith, suitable alternately-engaging surface-bearing clutches, suitably actuated for alternate engagement and release of the surface of the said wheel, all substantially as described and shown.

63. In a wire-fabric machine, the combination with suitable wire-delivery spools, weaving-spindles, and clamping mechanism for drawing out the fabric, of a revoluble reel-cylinder or frame, and the mechanism for turning the said cylinder consisting of a surface-driven wheel, suitably connected therewith and actuated continuously in one direction by forwardly and rearwardly actuated surface-engaging friction-clutch blocks, all substantially as described and shown.

64. In a wire-fabric machine, the combination with a revoluble reel-cylinder purposed for rolling up the fabric as it is delivered from the machine, of the mechanism for turning the said reel-cylinder, consisting of a surface-driven or peripherally-engaged wheel, two alternate surface-engaging clutches, suitably supported for close normally bearing relation with the surface-bearing wheel, and suitable mechanism for causing an alternate forward and rearward projection of said clutch-blocks, all substantially as described and shown.

65. In a wire-fabric machine, the combination with a revoluble reel-cylinder suitably mounted in the framework thereof, and designed to receive the woven fabric as delivered from the machine, of the driving and turning mechanism therefor consisting of surface or peripherally driven wheels, two surface-bearing clutch-blocks suitably mounted upon radial arms loosely journaled upon the same axis as the said surface-driven wheel, and bearing normally in close proximity to the surface of the said wheel, and suitable mechanism for causing the said clutch-blocks to be alternately forwardly and rearwardly actuated simultaneously for alternate engagement and release of the surface of the said wheel, and by each clutch alternately, all substantially as described and shown.

66. In a wire-fabric machine, the combination therewith with a revoluble reel-cylinder or frame for receiving the woven fabric as delivered from the machine, of the mechanism for turning the said cylinder or frame consisting of a surface-driven wheel suitably connected therewith, two surface or peripherally bearing impinging clutch-blocks, suitably mounted on radial arms journaled on the same shaft upon which said wheel is fixed, and bearing normally in close proximity to the surface of the said wheel, and suitable arms or levers, the forward ends thereof connecting pivotally with the free ends of the clutch-bearing radial arms, being pivoted together at their rear ends upon the same pin or center, and suitable mechanism for actuating the said arms alternately forwardly and rearwardly, all substantially as described and shown.

67. In a wire-fabric machine, the combination with a revoluble reel-cylinder, suitably mounted in the framework thereof and purposed to receive the woven fabric as delivered from the machine, of the mechanism for turning the said cylinder or frame consisting of a surface-driven wheel suitably connected therewith, two surface or peripheral bearing or impinging clutch-blocks bearing in close proximity to the surface of the said wheel, radial arms for supporting the same, journaled in loosely upon the same shaft upon which said wheel is fixed, and suitable arms or levers, the forward ends thereof connecting pivotally with the free ends of the clutch-bearing radial arms, and being pivoted together at their rear ends upon the same pin or center, and suitable mechanism for actuating the said arms alternately forwardly and rearwardly, all substantially as described and shown.

68. In a wire-fabric machine, the combination with a revoluble reel-cylinder or arm, suitably mounted therein, and provided for receiving and rolling up the woven fabric as delivered from the machine, of the mechanism for turning the said cylinder or frame consisting of a surface or peripherally engaged wheel suitably connected with said revoluble cylinder, two friction-clutch blocks substantially wedge-shaped and adjusted at opposites, bearing normally in close proximity to the surface of the said wheel, two radial arms journaled loosely upon the same shaft upon which said wheel is fixed for supporting the said clutch-blocks, and suitable mechanism for alternate and simultaneous forward and rearward actuation of said clutch-blocks corresponding distances, all substantially as described and shown.

69. In a wire-fabric machine, the combination with suitable woven spindles and suitable movable clamp mechanism for drawing out a fabric woven by the said spindles, of a revoluble reel-cylinder or frame for receiving and rolling up the fabric as delivered from the machine, and the mechanism for turning the said revoluble reel-cylinder or frame consisting of a surface or peripherally engaged wheel suitably connected with said revoluble cylinder, two friction-clutch blocks substantially wedge-shaped and suitably supported normally in close proximity to the surface of the said wheel, two radial arms journaled loosely upon the same shaft upon which the said wheel is fixed, and suitable mechanism for alternate and simultaneous forward and rearward actuation of said clutch-blocks corresponding distances, all substantially as described and shown.

70. In a wire-fabric machine, the combination with a revoluble reel-cylinder suitably mounted therein, and purposed to receive the woven fabric as delivered from the machine, of the mechanism for turning the said cylinder or frame consisting of a surface or peripherally engaged wheel suitably connected with the said revoluble cylinder, two clutch-blocks supported upon radial arms journaled loosely upon the same shaft to which the said wheel is fixed, and bearing normally in close proximity to the surface of the said wheel, two reaches their forward ends connected pivotally with the outer ends of the said clutch-blocks, supporting radial arms and pivoted at their rear extremities upon the same pin or center, an oscillating bar bearing the centering-point for said reaches at or near the central body portion of the said oscillating bar, and suitable mechanism for actuating the said oscillating bar forwardly and rearwardly, all substantially as described and shown.

71. In a wire-fabric machine, the combination with suitable weaving-spindles and suitable movable clamp for engaging and drawing out the woven fabric as it is formed by the said spindles, of a revoluble reel-cylinder or frame, suitably mounted in the framework of the machine, and purposed to receive and roll up the fabric as delivered from the machine and the mechanism for turning the said revoluble reel-cylinder or peripherally-engaged wheel connected with said revoluble cylinder, two clutch-blocks supported by radial arms journaled loosely upon the same shaft, to which said wheel is fixed, and bearing normally in close proximity to the surface of the said wheel, two reaches their forward ends connected pivotally with the outer ends of the said radial arms, and pivoted at their rear extremities upon the same pin or center, an oscillating bar bearing the centering-pin for said reaches at or near the central body portion of the said oscillating bar, and suitable mechanism for actuating the said oscillating bar alternately forwardly and rearwardly, all substantially as described and shown.

72. In a wire-fabric machine, the combination with a revoluble reel-cylinder or frame suitably mounted in the framework thereof, and purposed to receive the woven fabric as delivered from the machine, of the mechanism for turning the said cylinder or frame consisting of a surface or peripherally driven clutch-wheel, two substantially wedge-shaped impinging clutch-blocks adjusted practically at opposites and suitable support for forward and rearward actuation upon radial arms, centering loosely upon the same shaft upon which the said wheel is fixedly carried, two driving-arms the forward ends thereof suitably connected with the said clutches or with the supports therefor upon opposite sides of the said clutch-wheel, and having their rear extremities centered upon the same pin, an oscillating bar bearing the pin upon which the said reaches are centered at or near the central body portion thereof, and slotted below the said centering-pin, and suitable mechanism for actuating the said oscillating bar having an adjustable connection or relation with the said slotted portion of the said oscillating bar, all substantially as described and shown.

73. In a wire-fabric machine, the combination with a revoluble reel-cylinder or frame suitably mounted in the framework thereof, and purposed to receive and roll up the fabric delivered thereto from the machine, of the mechanism for turning the said wrapping cylinder or frame consisting of two friction-blocks actuated through an oscillating bar through clutch-driving arms connected with said clutch-blocks, and centering at a point at the rear extremities of the said arms upon a pin upon the said oscillating bar, suitable mechanism for connecting the said oscillating bar with the power to provide an adjustable relation between the connecting element and said oscillating bar at points below the centering pin or point for the reaches which actuate the clutch-blocks to turn the wheel, and suitable levers or reaches connecting the adjustable driving mechanism adjustably carried in connection with said oscillating bar with the surface of the fabric-roll, all substantially as described and shown.

74. In a wire-fabric machine, the combination with suitable weaving-spindles and a traveling clamp for securing the woven fabric and drawing it out, of a revoluble reel-cylinder or frame suitably mounted in connection with the framework of the machine and the mechanism for turning the said reel-cylinder or frame, consisting of two friction-clutch blocks actuated from an oscillating bar through clutch-driving arms connected with said clutch-blocks, and centering at a point at the rear extremities of the said arms upon a pin upon the oscillating bar, suitable mechanism for connecting the said oscillating bar with the power to provide an adjustable relation between the connecting element and said oscillating bar at points below the centering point or pin for the reaches which actuate the clutch-blocks to turn the wheel, and suitable levers or reaches connecting the adjustable driving mechanism carried in connection with said oscillating bar with the surface of the fabric-reel, all substantially as described and shown.

75. In a wire-fabric machine, the combination with a revoluble reel-cylinder or frame and the mechanism for turning the said reel-cylinder or frame, of the means for controlling the movement of the reel-cylinder consisting of an oscillating bar slotted at its lower end, a bar connected at one extremity with the power, and the other extremity thereof having an adjustable relation with the said oscillating bar, a reach pivotally connected at one extremity with the oscillating bar, and at its other extremity with a lever fulcrumed at a point between its extremities; a roller connected with the rear end of the fulcrumed lever, bearing constantly against the surface of the fabric being wrapped upon the reel-cylinder, all substantially as described and shown.

76. In a wire-fabric machine, the combination therewith of suitable spindles for weaving fabric, and with a traveling clamp for engaging the same and drawing it out, of a revoluble reel and the mechanism for turning the said reel consisting of a surface wheel, two friction-clutch blocks, carried one on either side of the said wheel, and suitably supported for close normal bearing relation with the surface of the said wheel, two driving-arms, one connected with each of said clutch-blocks and centering at their other extremities upon a pin on an oscillating bar; the oscillating bar pivoted at its upper extremity to enable it to swing, and slotted at points below the said pin thereon, a suitable reach connected at one extremity with the power, and the other extremity thereof having an adjustable relation with the said oscillating bar and the mechanism for graduating the turning of the said reel-cylinder consisting of a reach pivotally connected at one extremity with a pin on the end of the driving-reach carried on the oscillating bar, and at its other extremity with a lever fulcrumed at a point between its extremities; a roller connected with said fulcrumed lever and bearing constantly against the surface of the fabric being wrapped upon the reel, all substantially as described and shown.

77. In a wire-fabric machine, the combination with a revoluble cylinder of the mechanism for turning the said reel-cylinder, consisting of the wheel II suitably connected with the cylinder or frame, and the mechanism for turning the said wheel, consisting of two substantially wedge-shaped friction-blocks, suitably supported on opposite sides of the said wheel in close normal bearing relation therewith to accommodate when the same are operated, an alternate impinging and separated relation with the surface of the said wheel, and suitable mechanism for actuating the said clutches for such alternate impingement and release, first by one friction-block and then the other on the surface of the said wheel, whereby the said wheel will be turned during such actuation continuously in one direction, all substantially as described and shown.

78. In a wire-fabric machine, the combination with suitable fabric-weaving spindles, and a traveling clamp purposed to engage the fabric and draw it out, of a revoluble reel-cylinder or frame, the wheel H, and the mechanism for actuating the said wheel consisting of two substantially wedge-shaped friction-blocks, suitably supported on opposite sides of the said wheel in close normal bearing relation therewith to accommodate, when the same are operated, an alternate impinging and separate relation with the surface of the said wheel, and suitable mechanism for actuating the said clutches for such alternate impingement and release, first by one and then the other of the surface of the said wheels, whereby the said wheel will be turned during such actuation continuously in one direction, all substantially as described and shown.

79. In a wire-fabric machine, the combination with a revoluble reel-cylinder or frame of the wheel H, suitably connected with the said reel-cylinder, and the mechanism for turning the said friction-wheel H, consisting of two friction-blocks, suitably supported for close normal bearing relation with the surface of the said wheel, the said blocks being substantially wedge-shaped, and having suitable curved surfaces to correspond approximately with the arc of a circle described by the circumference of wheel H, and located upon opposite sides of the said wheels, and suitable mechanism for actuating the said clutches alternately back and forth, all substantially as described and shown.

80. In a wire-fabric machine, the combination with suitable weaving-spindles, and with a traveling clamp purposed to engage the fabric being woven, and to draw it out, of a revoluble reel-cylinder, and a surface-driven wheel, suitably connected with said reel-cylinder, and the mechanism for turning the said surface-driven wheel consisting of two friction-blocks, suitably supported for close normal bearing relation with the surface of the said wheel, the said blocks being substantially wedge-shaped, and having suitable curved surfaces to correspond approximately with the arc of a circle described by the circumference of wheel H, and located upon opposite sides of the said wheel and suitable mechanism for actuating the said clutches alternately back and forth, all substantially as described and shown.

81. In a wire-fabric machine, the combination with a reel-cylinder or frame A and the wheel H, suitably connected with the said reel-cylinder, of the mechanism for turning the said wheel H, in one continuous direction, consisting of the impinging blocks $n$, $n^2$, substantially wedge-shaped, the radial arms I, $I^2$, journaled loosely upon shaft F to which wheel II is fixed, and supporting the blocks $n$, $n^2$ between the antifriction-rollers $m$, $m^2$, respectively, and the circumference of wheel II, and the reaches J, $J^2$ pivoted each at one extremity and the radial arms I, $I^2$ and both centered at their other extremity upon a pin on oscillating bar K, the oscillating bar and suitable mechanism for actuating the said oscillating bar, all substantially as described and shown.

82. In a wire-fabric machine, the combination with suitable weaving-spindles, and with a traveling clamp purposed to engage the fabric woven by the said spindles, and to draw it out, of the revoluble reel-cylinder A, the wheel H suitably connected with said reel-cylinder, and the mechanism for turning the said wheel H in one continuous direction consisting of the impinging blocks $n$, $n^2$ substantially wedge-shaped, the radial arms I, I², journaled loosely upon shaft F, to which the wheel H is fixed and supporting the blocks $n$, $n^2$ between the antifriction-rollers $m$, $m^2$ respectively, and the circumference of wheel H, and the reaches J, J² pivoted each at one extremity, and the radial arms I, I² and both centered at their other extremity upon a pin on oscillating bar K, the oscillating bar K and suitable mechanism for actuating said oscillating bar, all substantially as described and shown.

83. In a wire-fabric machine, the combination with a reel-cylinder therein of an oscillating bar connected therewith by suitable intermediate parts, and suitable reach connected at one end with a driving power, and the other end thereof vertically shiftable with relation to the oscillating bar, and suitable mechanism connecting with the vertically-adjustable free end of said reach with the surface of the fabric upon the reel-cylinder, all substantially as described and shown.

84. In a wire-fabric machine, the combination with the reel-cylinder or frame thereof, of the oscillating bar K, slotted in the lower portion thereof, and connected with the reel-cylinder at a point above the slotted portion thereof by suitable intermediate driving parts, the reach 5 connected eccentrically at one end with a part driven from the power applied, the other end thereof provided with pin 6, and being adjusted vertically within the slot in the oscillating bar K, and suitable mechanism connecting pin 6 with the surface of the fabric, being rolled upon the reel-cylinder, all substantially as described and shown.

85. In a wire-fabric machine, the combination with the spindle-sections $f$, $f^2$ and $f^3$ and the revoluble clamp, of the revoluble reel-cylinder or frame A, and suitable mechanism for turning the said reel, all substantially as described and shown.

86. In a wire-fabric machine, the combination with disk 79 of the brake, formed of parts 82 and 83, part 82 pivoted upon frame part 83, and spring 81, said clamp being useful in clamping sprocket-chain B to retard its movement, all substantially as described and shown.

87. In a wire-fabric machine, the combination therewith of the pair of fingers $z$ carried in a suitable framework and pivoted upon a transversely-adjusted pin, and having connected therewith, spirally-wound wires, properly fixed to the framework in which the fingers are carried, all substantially as described and shown.

88. In a wire-fabric machine, the combination with the framework thereof of the series of fingers $z$ set in pairs, with the opening between the respective parts, in alinement with the wire-delivery passage in the respective sections $f$, $f^2$ and $f^3$ and suitably journaled and supported, and each respective finger having connected therewith a spiral spring to return the fingers to their normal position after being forwardly actuated, all substantially as described and shown.

89. In a wire-fabric machine, the combination with the cog-wheel $y$ on section $f$ having a portion of its circumference cogged, and having a portion thereof crescent-shaped and provided with lug 9, carried at the side of the cogs, and connected with the hub thereof, of the partially-cogged wheel X, the cogged portion interrupted at the middle portion with a lobed part, with the remainder of its circumference smooth and being further provided with straps as 10, all substantially as described and shown.

90. In a wire-fabric machine, the combination, with disk 79 of the registering device 87 suitably carried upon the framework, and actuated for the purpose of registering the amount of fabric made by the machine by means of disk 79 being turned by suitable means to cause the pins thereon to engage long arms extending outwardly from the register, all substantially as described and shown.

91. In a wire-fabric machine, the series of disks 88, 79, 89, 90 and 91, provided with one peripheral edge of each irregularly formed, the reaches 88ª, 148, 148ª, 139 and 134, having a bearing relation with said disks and connected with the friction-clutches on other suitable intermediate mechanism, to cause an alternate engagement and release of clutch-wheels driven on line-shaft 23ᵈ, all substantially as described and shown.

92. In a wire-fabric machine, the combination therewith of the series of disks 88, 79, 89, 90 and 91, fixed upon line-shaft 87, each disk having one peripheral edge irregularly formed and suitable pivoted reaches having a bearing relation with the peripheral edges of the disks and connecting with clutches adapted to engage clutch-wheels on power-shaft 23ᵈ, all substantially as described and shown.

93. In a wire-fabric machine, the combination with the carriage thereof, and in adjustment upon the forward face of the forward frame-piece B² through proper framework connected therewith, of the pivoted fingers A, and the mechanism for shifting the said fingers, consisting of the cogged segments 4, 4ª, suitably connected therewith, the short arm 3ª, the connecting-reach 3', and disk S, and suitable mechanism for turning the said disk S, all substantially as described and shown.

94. In a wire-fabric machine, the combination with the series of sections $f$, $f^2$ and $f^3$ of the revolving clamp provided with jaws for engaging the strands of a fabric and suitable mechanism for revolving the said clamp, and for properly operating the jaws thereon, all substantially as described and shown.

95. In a wire-fabric machine, the combination of the series of sections $f, f^2$ and $f^3$ suitably journaled for rotation in conjunction, successively, with the shiftable section $k$ in the carriage, and carrying, respectively, line-wires and cable-wires, and the shiftable section carrying the continuous wire thereof, the revolving clamp provided with suitable framework and having mounted thereon the series of jaws set in a number of rows upon its circumference, the reel I, suitable mechanism for turning the said clamp, and for actuating the jaws thereon, and suitable mechanism for turning said reel, and suitable mechanism for turning the spindles, formed by the matching relation of shiftable section $k$ with each section $f, f^2$ and $f^3$ successively, all substantially as described and shown.

96. In a wire-fabric machine, the combination with the respective outside twister-sections $f^2$ and $f^3$, of the spool-carrying frames $d, d^2$ suitably journaled for rotation and connected therewith, respectively, by reaches E, E, and suitable mechanism for turning the said combined parts, section $f^2$, and spool-carrying frame $d$, and section $f^3$ and spool-carrying frame $d^2$ simultaneously, all substantially as described and shown.

97. In a wire-fabric machine, the combination of twister-section $f^2$, provided upon its rear extremity with sprocket-wheel $n$, and the spool-carrying frame $d$, suitably journaled for rotation, with section $f^2$, the bar E, connecting section $f^2$, and the spool-carrying frame $d$, and suitable mechanism for turning and for controlling the turning of the said cable-section $f^2$ and spool-carrying frame $d$, all substantially as described and shown.

98. In a wire-fabric machine, the combination with twister-section $f^2$, having the sprocket-wheel $n$ upon its rear extremity, of the spool-carrying frame $d$ connected therewith by means of the bar E, all substantially as described and shown.

99. In a wire-fabric machine, the combination with the framework thereof, of reel I, and the mechanism for turning said reel, consisting of clutch-wheel 40, suitably connected therewith by shaft, sprocket-wheels and sprocket-chains, the pivoted arms 45ª, the long arms 45 and the short arms 45ª pivoted together, the antifriction-rollers 48, 48ª journaled upon the pivotal pins connecting arms 45 and 45ª, the friction-blocks 46, 46ª suitably supported to bear between antifriction-rollers 48, 48ª and the circumferential face of clutch-wheel 40, and provided with suitable spring tension, the oscillating slotted bar 44 to which arms 45 are pivoted, and means for actuating bar 44, substantially as described and shown.

100. In a wire-fabric machine, the combination with the shaft 87 and the series of disks 88, 79, 89, 90 and 91 fixed thereon provided with a notch on the peripheral edge of each, of the mechanism for turning said shaft 87 and the disks consisting of the radial arms 103, the curve-sided octagon 115, the disk 112, all in face-contact relation and fixed upon shaft 87, the disk-wheel 99 notched at 116, and provided with eccentrically-disposed antifriction-rollers 100, suitably journaled upon one face thereof, and suitable mechanism for turning said disk 99, substantially as described and shown.

101. In a wire-fabric machine, the combination therewith of the line-shaft 87 carrying a series of disk-wheels and means for turning the shaft intermittingly, consisting of the radial arms 103, the curve-sided octagon 115 and disk 112, all in face-contact relation and fixed upon shaft 87, the disk-wheel 99 notched at 116, and provided with eccentrically-disposed antifriction-roller 100, suitably journaled upon one face thereof, the sprocket-wheel 95 provided with pin projections 98, running loose upon auxiliary shaft 97, and connected with power-shaft 23ᵈ by sprocket-wheel and sprocket-chain, the lever 101 pivoted to disk 99, and suitable mechanism for causing lever 101 to engage pins 98 on sprocket-wheel 95, substantially as described and shown.

102. In a wire-fabric machine, the combination therewith of the line-shaft 87 carrying a series of disk-wheels and means for turning the shaft intermittingly, consisting of the radial arms 103, the curve-sided octagon 115 and disk 112, all in face-contact relation and fixed upon shaft 87, the disk-wheel 99 notched at 116, and provided with eccentrically-disposed antifriction-roller 100, suitably journaled upon one face thereof, the sprocket-wheel 95 provided with pin projections 98, running loose upon auxiliary shaft 97, and connected with power-shaft 23ᵈ by sprocket-wheel and sprocket-chain, the lever 101 pivoted to disk 99, the rack 104, so mounted as to permit its movement sidewise and back and forth and provided with lugs 104ª and antifriction-wheels 105 and 107, and means for shifting said rack, the straps 110 upon the face of disk 112 for engaging rack 104, and the spring 1003 for holding rack 104 under tension, substantially as described and shown.

In testimony whereof we affix our signatures in presence of two witnesses.

PETER SOMMER.
JOHN SOMMER.
PETER W. SOMMER.

Witnesses:
W. V. TEFFT,
MINNIE HALEY.